(12) United States Patent
Gebara et al.

(10) Patent No.: US 7,522,883 B2
(45) Date of Patent: Apr. 21, 2009

(54) METHOD AND SYSTEM FOR REDUCING SIGNAL INTERFERENCE

(75) Inventors: Edward Gebara, Atlanta, GA (US);
Andrew Joo Kim, Atlanta, GA (US);
Joy Laskar, Marietta, GA (US);
Anthony Stelliga, Cupertino, CA (US);
Emmanouil M. Tentzeris, Atlanta, GA (US)

(73) Assignee: Quellan, Inc., Atlanta, GA (US)

( * ) Notice: Subject to any disclaimer, the term of this patent is extended or adjusted under 35 U.S.C. 154(b) by 127 days.

(21) Appl. No.: 11/302,896

(22) Filed: Dec. 14, 2005

(65) Prior Publication Data

US 2006/0178157 A1    Aug. 10, 2006

Related U.S. Application Data

(60) Provisional application No. 60/635,817, filed on Dec. 14, 2004, provisional application No. 60/689,467, filed on Jun. 10, 2005, provisional application No. 60/696,905, filed on Jul. 6, 2005, provisional application No. 60/719,055, filed on Sep. 21, 2005, provisional application No. 60/720,324, filed on Sep. 23, 2005.

(51) Int. Cl.
*H04B 1/00* (2006.01)
*H04B 15/00* (2006.01)

(52) U.S. Cl. .................. 455/63.1; 455/63.3; 455/67.11; 455/296; 385/100; 385/101; 385/114

(58) Field of Classification Search ................ 455/63.1, 455/63.3, 67.11, 278.1, 296; 385/100, 101, 385/114

See application file for complete search history.

(56) References Cited

U.S. PATENT DOCUMENTS 2,632,058 A    3/1953    Gray ........................... 178/15

(Continued)

FOREIGN PATENT DOCUMENTS

EP    0 527 966 B1    9/1994

(Continued)

OTHER PUBLICATIONS

André et al.; *InP DHBT Technology and Design Methodology for High-Bit-Rate Optical Communications Circuits*; IEEE Journal of Solid-State Circuits; vol. 33, No. 9, Sep. 1998; pp. 1328-1335.

(Continued)

*Primary Examiner*—Tuan A Pham
(74) *Attorney, Agent, or Firm*—King & Spalding LLP

(57) ABSTRACT

Signals propagating on an aggressor communication channel can cause interference in a victim communication channel. A sensor coupled to the aggressor channel can obtain a sample of the aggressor signal. The sensor can be integrated with or embedded in a system, such as a flex circuit or a circuit board, that comprises the aggressor channel. The sensor can comprise a dedicated conductor or circuit trace that is near an aggressor conductor, a victim conductor, or an EM field associated with the interference. An interference compensation circuit can receive the sample from the sensor. The interference compensation circuit can have at least two operational modes of operation. In the first mode, the circuit can actively generate or output a compensation signal that cancels, corrects, or suppresses the interference. The second mode can be a standby, idle, power-saving, passive, or sleep mode.

17 Claims, 7 Drawing Sheets

U.S. PATENT DOCUMENTS

| | | |
|---|---|---|
| 3,445,771 A | 5/1969 | Clapham et al. ............... 325/42 |
| 3,571,725 A | 3/1971 | Kaneko et al. ................. 328/14 |
| 3,599,122 A | 8/1971 | Leuthoki ..................... 333/29 |
| 3,633,108 A | 1/1972 | Kneuer ........................ 325/323 |
| 3,714,437 A | 1/1973 | Kinsel ......................... 359/185 |
| 3,806,915 A | 4/1974 | Higgins et al. .............. 340/347 |
| 3,977,795 A | 8/1976 | Buschmann ................ 356/256 |
| 4,201,909 A | 5/1980 | Dogliotti et al. ............ 455/608 |
| 4,287,756 A | 9/1981 | Gallagher ................ 73/61.1 R |
| 4,288,872 A | 9/1981 | Tamburelli ................... 375/14 |
| 4,349,914 A | 9/1982 | Evans .......................... 375/40 |
| 4,363,127 A | 12/1982 | Evans et al. ................... 375/30 |
| 4,386,339 A | 5/1983 | Henry et al. ................ 340/347 |
| 4,387,461 A | 6/1983 | Evans ............................ 371/5 |
| 4,393,499 A | 7/1983 | Evans ............................ 371/5 |
| 4,410,878 A | 10/1983 | Stach ................. 340/347 DD |
| 4,464,771 A | 8/1984 | Sorensen ..................... 375/120 |
| 4,470,126 A | 9/1984 | Haque ........................ 364/825 |
| 4,475,227 A | 10/1984 | Belfield ....................... 381/30 |
| 4,479,266 A | 10/1984 | Eumurian et al. ........... 455/608 |
| 4,521,883 A | 6/1985 | Roché ......................... 370/100 |
| 4,580,263 A | 4/1986 | Watanabe et al. .............. 371/5 |
| 4,584,720 A | 4/1986 | Garrett ....................... 455/608 |
| 4,618,941 A | 10/1986 | Linder et al. ................. 364/724 |
| 4,646,173 A | 2/1987 | Kammeyer et al. ........... 360/51 |
| 4,651,026 A | 3/1987 | Serfaty et al. ............... 307/269 |
| 4,751,497 A | 6/1988 | Torii ........................... 340/347 |
| 4,830,493 A | 5/1989 | Giebeler ..................... 356/328 |
| 4,847,521 A | 7/1989 | Huignard et al. ............ 307/425 |
| 4,864,590 A | 9/1989 | Arnon et al. .................. 375/14 |
| 4,873,700 A | 10/1989 | Wong ........................... 375/76 |
| 4,912,726 A | 3/1990 | Iwamatsu et al. .............. 375/20 |
| 4,942,593 A | 7/1990 | Whiteside et al. ........... 375/118 |
| 4,953,041 A | 8/1990 | Huber ......................... 360/46 |
| 4,959,535 A | 9/1990 | Garrett ..................... 250/214 R |
| 4,978,957 A | 12/1990 | Hotta et al. ................. 341/156 |
| 5,007,106 A | 4/1991 | Kahn et al. ................. 455/619 |
| 5,008,957 A | 4/1991 | Klyono ....................... 455/618 |
| 5,012,475 A | 4/1991 | Campbell .................... 372/29 |
| 5,067,126 A | 11/1991 | Moore ....................... 370/112 |
| 5,072,221 A | 12/1991 | Schmidt ..................... 341/159 |
| 5,111,065 A | 5/1992 | Roberge ..................... 307/270 |
| 5,113,278 A | 5/1992 | Degura et al. ............... 359/154 |
| 5,115,450 A | 5/1992 | Arcuri ........................... 375/7 |
| 5,121,411 A | 6/1992 | Fluharty ...................... 375/20 |
| 5,128,790 A | 7/1992 | Heidemann et al. ......... 359/132 |
| 5,132,639 A | 7/1992 | Blauvelt et al. ............. 330/149 |
| 5,151,698 A | 9/1992 | Pophillat ..................... 341/52 |
| 5,152,010 A | 9/1992 | Talwar |
| 5,181,034 A | 1/1993 | Takakura et al. ............. 341/144 |
| 5,181,136 A | 1/1993 | Kavehrad et al. ........... 359/190 |
| 5,184,131 A | 2/1993 | Ikeda ........................ 341/165 |
| 5,208,833 A | 5/1993 | Erhart et al. .................. 375/20 |
| 5,222,103 A | 6/1993 | Gross .......................... 375/54 |
| 5,223,834 A | 6/1993 | Wang et al. ................. 341/136 |
| 5,225,798 A | 7/1993 | Hunsinger et al. ........... 333/165 |
| 5,237,590 A | 8/1993 | Kazawa et al. ................ 375/20 |
| 5,243,613 A | 9/1993 | Gysel et al. .................. 372/26 |
| 5,252,930 A | 10/1993 | Blauvelt ..................... 330/149 |
| 5,282,072 A | 1/1994 | Nazarathy et al. ........... 359/157 |
| 5,283,679 A | 2/1994 | Wedding .................... 359/154 |
| 5,291,031 A | 3/1994 | MacDonald et al. ........ 250/577 |
| 5,293,406 A | 3/1994 | Suzuki ......................... 375/59 |
| 5,300,930 A | 4/1994 | Burger et al. ................ 341/96 |
| 5,321,543 A | 6/1994 | Huber ........................ 359/187 |
| 5,321,710 A | 6/1994 | Cornish et al. ................ 372/26 |
| 5,327,279 A | 7/1994 | Farina et al. ................. 359/180 |
| 5,343,322 A | 8/1994 | Pirio et al. ................... 359/173 |
| 5,351,148 A | 9/1994 | Maeda et al. ............... 359/124 |
| 5,355,240 A | 10/1994 | Prigent et al. ............... 359/161 |
| 5,361,156 A | 11/1994 | Pidgeon ..................... 359/161 |
| 5,371,625 A | 12/1994 | Wedding et al. ............. 319/173 |
| 5,373,384 A | 12/1994 | Hebert ....................... 359/161 |
| 5,376,786 A | 12/1994 | MacDonald ........... 250/227.12 |
| 5,382,955 A | 1/1995 | Knierim ...................... 341/64 |
| 5,387,887 A | 2/1995 | Zimmerman et al. ........ 333/166 |
| 5,408,485 A | 4/1995 | Ries ........................... 372/38 |
| 5,413,047 A | 5/1995 | Evans et al. ................. 102/302 |
| 5,416,628 A | 5/1995 | Betti et al. .................. 359/181 |
| 5,418,637 A | 5/1995 | Kuo .......................... 359/161 |
| 5,424,680 A | 6/1995 | Nazarathy et al. ........... 330/149 |
| 5,428,643 A | 6/1995 | Razzell ....................... 375/308 |
| 5,428,831 A | 6/1995 | Monzello et al. ............ 455/296 |
| 5,436,752 A | 7/1995 | Wedding .................... 359/195 |
| 5,436,756 A | 7/1995 | Knox et al. ................. 359/260 |
| 5,444,864 A | 8/1995 | Smith ......................... 455/84 |
| 5,450,044 A | 9/1995 | Hulick ....................... 332/103 |
| 5,481,389 A | 1/1996 | Pidgeon et al. .............. 359/161 |
| 5,481,568 A | 1/1996 | Yada ......................... 375/340 |
| 5,483,552 A | 1/1996 | Shimazaki et al. ........... 375/233 |
| 5,504,633 A | 4/1996 | Van Den Enden ............. 360/65 |
| 5,510,919 A | 4/1996 | Wedding .................... 359/115 |
| 5,515,196 A | 5/1996 | Kitajima et al. ............. 359/180 |
| 5,528,710 A | 6/1996 | Burton et al. ................. 385/16 |
| 5,541,955 A | 7/1996 | Jacobsmeyer ............... 375/222 |
| 5,548,253 A | 8/1996 | Durrant ...................... 332/103 |
| 5,557,439 A | 9/1996 | Alexander et al. .......... 359/130 |
| 5,574,743 A | 11/1996 | van der Poel et al. ......... 372/46 |
| 5,574,978 A * | 11/1996 | Talwar et al. ............... 455/63.1 |
| 5,589,786 A | 12/1996 | Bella et al. .................. 327/108 |
| 5,606,734 A | 2/1997 | Bahu ......................... 455/303 |
| 5,612,653 A | 3/1997 | Dodds et al. ................. 333/124 |
| 5,617,135 A | 4/1997 | Noda et al. ................... 348/12 |
| 5,621,764 A | 4/1997 | Ushirokawa et al. ........ 375/317 |
| 5,625,360 A | 4/1997 | Garrity et al. ................ 341/144 |
| 5,625,722 A | 4/1997 | Froberg et al. ................. 385/1 |
| 5,644,325 A | 7/1997 | King et al. ................... 345/20 |
| 5,648,987 A | 7/1997 | Yang et al. .................. 375/232 |
| 5,670,871 A | 9/1997 | Man et al. .................... 324/96 |
| 5,675,600 A | 10/1997 | Yamamoto et al. ............. 372/38 |
| 5,678,198 A | 10/1997 | Lemson ..................... 455/67.1 |
| 5,689,356 A | 11/1997 | Rainal ........................ 359/181 |
| 5,691,978 A | 11/1997 | Kenworthy ................. 370/278 |
| 5,692,011 A | 11/1997 | Nobakht et al. .............. 375/233 |
| 5,699,022 A | 12/1997 | Tovar ......................... 333/18 |
| 5,706,008 A | 1/1998 | Huntley, Jr. et al. ......... 341/156 |
| 5,721,315 A | 2/1998 | Evans et al. ................... 525/74 |
| 5,723,176 A | 3/1998 | Keyworth et al. ........ 427/163.2 |
| 5,751,726 A | 5/1998 | Kim ............................ 371/6 |
| 5,754,681 A | 5/1998 | Watanabe et al. ............ 382/159 |
| 5,757,763 A | 5/1998 | Green et al. ............. 369/275.3 |
| 5,761,243 A | 6/1998 | Russell et al. ................ 375/233 |
| 5,764,542 A | 6/1998 | Gaudette et al. ............. 364/574 |
| 5,774,505 A | 6/1998 | Baugh ........................ 375/348 |
| 5,783,630 A | 7/1998 | Evans et al. ................... 525/74 |
| 5,784,032 A | 7/1998 | Johnston et al. ............. 343/702 |
| 5,790,595 A | 8/1998 | Benthin et al. ............... 375/224 |
| 5,798,854 A | 8/1998 | Blauvelt et al. .............. 359/161 |
| 5,801,657 A | 9/1998 | Fowler et al. ................ 341/155 |
| 5,802,089 A | 9/1998 | Link .......................... 372/38 |
| 5,812,578 A | 9/1998 | Schemmann et al. .......... 372/46 |
| 5,825,211 A | 10/1998 | Smith et al. .................. 327/19 |
| 5,825,257 A | 10/1998 | Klymyshyn et al. ......... 332/100 |
| 5,825,825 A | 10/1998 | Altmann et al. .............. 375/293 |
| 5,828,329 A | 10/1998 | Burns ........................ 341/155 |
| 5,835,848 A | 11/1998 | Bi et al. ....................... 455/24 |
| 5,839,105 A | 11/1998 | Ostendorf et al. ............ 704/256 |
| 5,841,841 A | 11/1998 | Dodds et al. .............. 379/93.08 |
| 5,844,436 A | 12/1998 | Altmann ..................... 327/156 |
| 5,848,139 A | 12/1998 | Grover ....................... 379/114 |
| 5,850,409 A | 12/1998 | Link .......................... 372/38 |
| 5,850,505 A | 12/1998 | Grover et al. ........... 395/182.02 |
| 5,852,389 A | 12/1998 | Kumar et al. ............... 332/103 |
| 5,859,862 A | 1/1999 | Hikasa et al. ................. 372/38 |

| | | | |
|---|---|---|---|
| 5,861,966 A | 1/1999 | Ortel | 351/125 |
| 5,872,468 A | 2/1999 | Dyke | 327/72 |
| 5,878,390 A | 3/1999 | Kawai et al. | 704/231 |
| 5,880,870 A | 3/1999 | Sieben et al. | 359/181 |
| 5,883,910 A | 3/1999 | Link | 372/38 |
| 5,887,022 A | 3/1999 | Lee et al. | 375/202 |
| 5,889,759 A | 3/1999 | McGibney | 370/207 |
| 5,896,392 A | 4/1999 | Ono et al. | 371/5.2 |
| 5,912,749 A | 6/1999 | Harstead et al. | 359/123 |
| 5,920,600 A | 7/1999 | Yamaoka et al. | 375/376 |
| 5,923,226 A | 7/1999 | Kakura et al. | 333/18 |
| 5,942,576 A | 8/1999 | Evans et al. | 525/73 |
| 5,943,380 A | 8/1999 | Marchesani et al. | 375/376 |
| 5,943,457 A | 8/1999 | Hayward et al. | 385/24 |
| 5,949,926 A | 9/1999 | Davies | 385/3 |
| 5,959,032 A | 9/1999 | Evans et al. | 525/74 |
| 5,959,750 A | 9/1999 | Eskildsen et al. | 359/134 |
| 5,965,667 A | 10/1999 | Evans et al. | 525/74 |
| 5,968,198 A | 10/1999 | Hassan et al. | 714/752 |
| 5,978,417 A | 11/1999 | Baker et al. | 375/232 |
| 5,983,178 A | 11/1999 | Naito et al. | 704/245 |
| 5,985,999 A | 11/1999 | Dominguez et al. | 525/74 |
| 5,995,565 A | 11/1999 | Tong et al. | 375/346 |
| 5,999,300 A | 12/1999 | Davies et al. | 359/183 |
| 6,002,274 A | 12/1999 | Smith et al. | 327/19 |
| 6,002,717 A | 12/1999 | Gaudet | 375/232 |
| 6,009,424 A | 12/1999 | Lepage et al. | 707/6 |
| 6,011,952 A | 1/2000 | Dankberg et al. | 455/24 |
| 6,021,110 A | 2/2000 | McGibney | 370/208 |
| 6,028,658 A | 2/2000 | Hamada et al. | 352/129 |
| 6,031,048 A | 2/2000 | Evans et al. | 525/73 |
| 6,031,866 A | 2/2000 | Oler et al. | 375/219 |
| 6,031,874 A | 2/2000 | Chennakeshu et al. | 375/262 |
| 6,034,996 A | 3/2000 | Herzberg | 375/265 |
| 6,035,080 A | 3/2000 | Henry et al. | 385/24 |
| 6,041,299 A | 3/2000 | Schuster et al. | 704/232 |
| 6,052,420 A | 4/2000 | Yeap et al. | 375/324 |
| 6,072,364 A | 6/2000 | Jeckeln et al. | 330/149 |
| 6,072,615 A | 6/2000 | Mamyshev | 359/183 |
| 6,078,627 A | 6/2000 | Crayford | 375/286 |
| 6,084,931 A | 7/2000 | Powell, II et al. | 375/355 |
| 6,091,782 A | 7/2000 | Harano | 375/287 |
| 6,093,496 A | 7/2000 | Dominguez et al. | 428/500 |
| 6,093,773 A | 7/2000 | Evans et al. | 525/73 |
| 6,108,474 A | 8/2000 | Eggleton et al. | 385/122 |
| 6,111,477 A | 8/2000 | Klymyshyn et al. | 333/139 |
| 6,118,563 A | 9/2000 | Boskovic et al. | 359/124 |
| 6,118,567 A | 9/2000 | Alameh et al. | 359/189 |
| 6,127,480 A | 10/2000 | Dominguez et al. | 525/74 |
| 6,140,416 A | 10/2000 | Evans et al. | 525/74 |
| 6,140,858 A | 10/2000 | Dumont | 327/317 |
| 6,140,972 A | 10/2000 | Johnston et al. | 343/725 |
| 6,141,127 A | 10/2000 | Boivin et al. | 359/124 |
| 6,141,387 A | 10/2000 | Zhang | 375/261 |
| 6,148,428 A | 11/2000 | Welch et al. | 714/752 |
| 6,151,150 A | 11/2000 | Kikuchi | 359/194 |
| 6,154,301 A | 11/2000 | Harvey | 359/193 |
| 6,163,638 A | 12/2000 | Eggleton et al. | 385/37 |
| 6,169,764 B1 | 1/2001 | Babanezhad | 375/233 |
| 6,169,912 B1 | 1/2001 | Zuckerman | 455/570 |
| 6,181,454 B1 | 1/2001 | Nagahori et al. | 359/189 |
| 6,191,719 B1 | 2/2001 | Bult et al. | 341/144 |
| 6,201,916 B1 | 3/2001 | Eggleton et al. | 385/122 |
| 6,208,792 B1 | 3/2001 | Hwang et al. | 385/129 |
| 6,211,978 B1 | 4/2001 | Wojtunik | 359/114 |
| 6,212,654 B1 | 4/2001 | Lou et al. | 714/701 |
| 6,214,914 B1 | 4/2001 | Evans et al. | 524/323 |
| 6,215,812 B1 | 4/2001 | Young et al. | 375/144 |
| 6,219,633 B1 | 4/2001 | Lepage | 704/9 |
| 6,222,861 B1 | 4/2001 | Kuo et al. | 372/20 |
| 6,226,112 B1 | 5/2001 | Denk et al. | 359/138 |
| 6,236,963 B1 | 5/2001 | Naito et al. | 704/241 |
| 6,259,836 B1 | 7/2001 | Dodds | 385/24 |
| 6,259,847 B1 | 7/2001 | Lenz et al. | 385/131 |
| 6,268,816 B1 | 7/2001 | Bult et al. | 341/144 |
| 6,271,690 B1 | 8/2001 | Hirano et al. | 327/75 |
| 6,271,944 B1 | 8/2001 | Schemmann et al. | 359/124 |
| 6,281,824 B1 | 8/2001 | Masuda | 341/144 |
| 6,288,668 B1 | 9/2001 | Tsukamoto et al. | 341/172 |
| 6,289,055 B1 | 9/2001 | Knotz | 375/286 |
| 6,289,151 B1 | 9/2001 | Kazarinov et al. | 385/32 |
| 6,295,325 B1 | 9/2001 | Farrow et al. | 375/327 |
| 6,297,678 B1 | 10/2001 | Gholami | 327/198 |
| 6,298,459 B1 | 10/2001 | Tsukamoto | 714/746 |
| 6,304,199 B1 | 10/2001 | Fang et al. | 341/118 |
| 6,311,045 B1 | 10/2001 | Domokos | 455/78 |
| 6,313,713 B1 | 11/2001 | Ho et al. | 333/1.1 |
| 6,314,147 B1 | 11/2001 | Liang et al. | 375/346 |
| 6,317,247 B1 | 11/2001 | Yang et al. | 359/245 |
| 6,317,469 B1 | 11/2001 | Herbert | 375/293 |
| 6,341,023 B1 | 1/2002 | Puc | 359/124 |
| 6,356,374 B1 | 3/2002 | Farhan | 359/180 |
| 6,388,786 B1 | 5/2002 | Ono et al. | 359/181 |
| 6,411,117 B1 | 6/2002 | Hatamian | 324/765 |
| 6,421,155 B1 | 7/2002 | Yano | 359/181 |
| 6,445,476 B1 | 9/2002 | Kahn et al. | 359/184 |
| 6,473,131 B1 | 10/2002 | Neugebauer et al. | 348/572 |
| 6,501,792 B2 | 12/2002 | Webster | 375/232 |
| 6,539,204 B1 | 3/2003 | Marsh et al. | 455/63 |
| 6,560,257 B1 | 5/2003 | DeSalvo et al. | 372/38.02 |
| 6,650,189 B1 * | 11/2003 | Romao | 331/49 |
| 6,665,348 B1 | 12/2003 | Feher | 375/259 |
| 6,665,500 B2 | 12/2003 | Snawerdt | 398/185 |
| 6,718,138 B1 | 4/2004 | Sugawara | 398/9 |
| 6,751,587 B2 | 6/2004 | Thyssen et al. | 704/228 |
| 6,816,101 B2 | 11/2004 | Hietala et al. | 341/155 |
| 6,819,166 B1 | 11/2004 | Choi et al. | 327/551 |
| 6,961,019 B1 | 11/2005 | McConnell et al. | 342/357.1 |
| 7,035,361 B2 | 4/2006 | Kim et al. | 375/350 |
| 7,050,388 B2 | 5/2006 | Kim et al. | 370/201 |
| 2001/0024542 A1 | 9/2001 | Aina et al. | 385/24 |
| 2002/0086640 A1 | 7/2002 | Belcher et al. | 455/63.1 |
| 2002/0196508 A1 | 12/2002 | Wei et al. | 359/183 |
| 2003/0002121 A1 | 1/2003 | Miyamoto et al. | 359/183 |
| 2003/0008628 A1 | 1/2003 | Lindell et al. | 455/180.1 |
| 2003/0030876 A1 | 2/2003 | Takei | 359/187 |
| 2003/0053534 A1 | 3/2003 | Sivadas et al. | 375/229 |
| 2003/0058976 A1 | 3/2003 | Ohta et al. | 375/350 |
| 2003/0063354 A1 | 4/2003 | Davidson | 359/189 |
| 2003/0067990 A1 | 4/2003 | Bryant | 375/259 |
| 2004/0053578 A1 * | 3/2004 | Grabon et al. | 455/73 |
| 2004/0114888 A1 * | 6/2004 | Rich et al. | 385/101 |
| 2004/0192232 A1 * | 9/2004 | Szopko et al. | 455/103 |
| 2004/0197103 A1 | 10/2004 | Roberts et al. | 398/159 |
| 2004/0213354 A1 | 10/2004 | Jones et al. | 375/285 |
| 2004/0218756 A1 | 11/2004 | Tang et al. | 379/417 |
| 2005/0069063 A1 | 3/2005 | Waltho et al. | 375/346 |
| 2006/0164282 A1 * | 7/2006 | Duff et al. | 342/14 |

FOREIGN PATENT DOCUMENTS

| | | |
|---|---|---|
| EP | 0 584 865 B1 | 3/2000 |
| GB | 2 223 369 A | 4/1990 |
| GB | 2 306 066 A | 4/1997 |
| JP | 62082659 | 10/1988 |
| JP | 1990000063162 | 11/1991 |
| JP | 04187738 | 7/1992 |
| JP | 08079186 A | 3/1996 |
| WO | WO/2006/065883 A2 | 9/1994 |
| WO | WO 99/45683 A1 | 9/1999 |
| WO | WO 01/41346 A2 | 6/2001 |
| WO | WO 02/067521 A1 | 8/2002 |
| WO | WO 02/082694 A1 | 10/2002 |
| WO | WO 02/091600 A2 | 11/2002 |
| WO | WO 03/071731 A1 | 8/2003 |
| WO | WO 03/077423 A2 | 9/2003 |

| WO | WO 03/092237 A1 | 11/2003 |
| WO | WO 2004/008782 A2 | 1/2004 |
| WO | WO 2004/045078 A2 | 5/2004 |
| WO | WO 2004/088857 A2 | 10/2004 |
| WO | WO 2005/018134 A2 | 2/2005 |
| WO | WO 2005/050896 A2 | 6/2005 |

OTHER PUBLICATIONS

Borjak et al.; *High-Speed Generalized Distributed-Amplifier-Based Transversal-Filter Topology for Optical Communication Systems*; IEEE Transactions on Microwave Theory and Techniques; vol. 45, No. 8; Aug. 1997; pp. 1453-1457.

Buchali et al.; *Fast Eye Monitor for 10 Gbit/s and its Application for Optical PMD Compensation*; Optical Society of America; (2000); pp. TuP5-1-TuP1-3.

Cartledge et al.; *Performance of Smart Lightwave Receivers With Linear Equalization*; Journal of Lightwave Technology; vol. 10, No. 8; Aug. 1992; pp. 1105-1109.

Chi et al.; *Transmission Performance of All-Optically Labelled Packets Using ASK/DPSK Orthogonal Modulation*; The 15$^{th}$ Annual Meeting of the IEEE Lasers and Electro-Optics Society, 2002; LEOS 2002; Nov. 10-14, 2002; vol. 1:51-52. The whole document.

Chiang et al.; *Implementation of STARNET: A WDM Computer Communications Network*; IEEE Journal on Selected Areas in Communications; Jun. 1996; vol. 14, No. 5; pp. 824-839.

Choi et al.; *A 0.18-μm CMOS 3.5-Gb/s Continuous-Time Adaptive Cable Equalizer Using Enhanced Low-Frequency Gain Control Method*; IEEE Journal of Solid-State Circuits; Mar. 2004; vol. 39, No. 3; pp. 419-425.

Cimini et al.; *Can Multilevel Signaling Improve the Spectral Efficiency of ASK Optical FDM Systems?*; IEEE Transactions on Communications; vol. 41, No. 7; Jul. 1993; pp. 1084-1090.

Enning et al.; *Design and Test of Novel Integrate and Dump Filter (I&D) for Optical Gbit/s System Applications*; Electronics Letters; (Nov. 21, 1991); vol. 27, No. 24; pp. 2286-2288.

Garrett, Ian; *Pulse-Position Modulation for Transmission Over Optical Fibers with Direct or Heterodyne Detection*; IEEE Transactions on Communications; vol. COM-31; No. 4; Apr. 1983; pp. 518-527.

Godin et al.; *A InP DHBT Technology for High Bit-rate Optical Communications Circuits*; IEEE; (1997); pp. 219-222.

Haskins et al.; *FET Diode Linearizer Optimization for Amplifier Predistortion in Digital Radios*; IEEE Microwave and Guided Wave Letters; vol. 10, No. 1; Jan. 2000; pp. 21-23.

Hranilovic et al.; *A Multilevel Modulation Scheme for High-Speed Wireless Infrared Communications*; IEEE; (1999); pp. VI-338-VI-341.

Idler et al.; *40 Gbit/s Quaternary Dispersion Supported Transmission Field Trial Over 86 km Standard Singlemode Fibre*; 24$^{th}$ European Conference on Optical Communication; Sep. 1998; pp. 145-147.

Jutzi, Wilhelm; *Microwave Bandwidth Active Transversal Filter Concept with MESFTs*; IEEE Transactions on Microwave Theory and Technique, vol. MTT-19, No. 9; Sep. 1971; pp. 760-767.

Kaess et al.; *New Encoding Scheme for High-Speed Flash ADC's*; IEEE International Symposium on Circuits and Systems; Jun. 9-12, 1997; Hong Kong; pp. 5-8.

Kaiser et al.; *Reduced Complexity Optical Duobinary 10-Gb/s Transmitter Setup Resulting in an Increased Transmission Distance*; IEEE Photonics Technology Letters; Aug. 2001; vol. 13; No. 8; pp. 884-886.

Kannangara et al.; *Adaptive Duplexer for Multiband Transreceiver*; Radio and Wireless Conference; Aug. 10-13, 2003; Rawcon '03; pp. 381-384.

Kannangara et al.; *Adaptive Duplexer for Software Radio*; Approximate Date: Nov. 11-13, 2002.

Kannangara et al.; *An Alogorithm to Use in Adaptive Wideband Duplexer for Software Radio*; IEICE Transactions on Communications; Dec. 2003; vol. E86-B, No. 12; pp. 3452-3455.

Kannangara et al.; *Performance Analysis of the Cancellation Unit in an Adaptive Wideband Duplexer for Software Radio*; ATcrc Telecommunications and Networking Conference & Workshop, Melbourne, Australia, Dec. 11-12, 2003.

Lee et al.; *Effects of Decision Ambiguity Level on Optical Receiver Sensitivity*; IEEE Phontonics Technology Letters; vol. 7, No. 19; Oct. 1995; pp. 1204-1206.

Marcuse, Dietrich; *Calculation of Bit-Error Probability for a Lightwave System with Optical Amplifiers and Post-Detection Gaussian Noise*; Journal of Lightwave Technology; vol. 9, No. 4; Apr. 1991; pp. 505-513.

Megherbi et al.; *A GaAs-HBT A/D Gray-Code Converter*; IEEE; (1997); pp. 209-212.

Nazarathy et al.; *Progress in Externally Modulated AM CATV Transmission Systems*; Journal of Lightwave Technology; vol. 11, No, 1; Jan. 1993; pp. 82-105.

Oehler et al.; *A 3.6 Gigasample/s 5 bit Analog to Digital Converter Using 0.3 μm AlGaAs-HEMT Technology*; IEEE; (1993); pp. 163-164.

Ohm et al.; *Quaternary Optical ASK-DPSK and Receivers with Direct Detection*; IEEE Photonics Technology Letters; Jan. 2003; vol. 15, No. 1; pp. 159-161.

Ohtsuki et al.; *BER Performance of Turbo-Coded PPM CDMA Systems on Optical Fiber*; Journal of Lightwave Technology; vol. 18; No. 12; Dec. 2000; pp. 1776-1784.

Ota et al.; *High-Speed, Burst-Mode, Packet-Capable Optical Receiver and Instantaneous Clock Recovery for Optical Bus Operation*; Journal of Lightwave Technology; vol. 12, No. 2; Feb. 1994; pp. 325-331.

Paul, et al.; *3 Gbit/s Optically Preamplified Direct Detection DPSK Receiver With 116 photon/bit Sensitivity*; Electronics Letters; vol. 29, No. 7; Apr. 1, 1993; pp. 614-615.

Penninckx et al.; *Optical Differential Phase Shift Keying (DPSK) Direct Detection Considered as a Duobinary Signal*; Proc. 27$^{th}$ Eur. Conf. on Opt. Comm. (ECOC'01—Amsterdam); vol. 3; Sep. 30 to Oct. 4, 2001; pp. 456-457.

Poulton et al.; *An 8-GSa/s 8-bit ADC System*; Symposium on VLSI Circuits Digest of Technical Papers; (1997); pp. 23-24.

Poulton et al.; *A 6-b, 4 GSa/s GaAs HBT ADC*; IEEE Journal of Solid-State Circuits; vol. 30, No. 10.; Oct. 1995; pp. 1109-1118.

Poulton et al.; *A 6-bit, 4 GSa/s ADC Fabricated in a GaAs HBT Process*; IEEE; (1994); pp. 240-243.

Prasetyo et al.; *Application for Amplitude Gain Estimation Techniques for Multilevel Modulation in OFDM Systems*; IEEE; (1998); pp. 821-824.

Rohde et al.; *Robustness of DPSK Direct Detection Transmission Format in Standard Fibre WDM Systems*; Electronics Letters; vol. 36, No. 17; Aug. 17, 2000; pp. 1483-1484.

Runge et al.; *High-Speed Circuits for Lighwave Communications*; 1999; World Scientific, pp. 181-184.

Shirasaki et al.; *Fibre Transmission Properties of Optical Pulses Produced Through Direct Phase Modulation of DFB Laser Diode*; Electronics Letters; vol. 24, No. 8; Apr. 14, 1988; pp. 486-488.

Su et al.; *Inherent Transmission Capacity Penalty of Burst-Mode Receiver for Optical Multiaccess Networks*; IEEE Photonics Technology Letters; vol. 6, No. 5; May 1994; pp. 664-667.

Vodhanel et al.; *Performance of Directly Modulated DFB Lasers in 10-Gb/s ASK, FSK, and DPSK Lightwave Systems*; Journal of Lightwave Technology; Sep. 1990; vol. 8, No. 9; pp. 1379-1386.

Wakimoto et al.; *Si Bipolar 2-GHz 6-bit Flash A/D Conversion LSI*; IEEE Journal of Solid-State Circuits; Dec. 1988; vol. 23, No. 6; pp. 1345-1350.

Walkin et al.; *A 10 Gb/s 4-ary ASK Lightwave System*; ECOC; 1997; pp. 255-258.

Walklin et al.; *Multilevel Signaling for Extending the Dispersion-Limited Transmission Distance in High-Speed, Fiber Optic Communication Systems*; IEEE; 1996; pp. 233-236.

Walklin et al., *Multilevel Signaling for Increasing the Reach of 10 Gb/s Lightwave Systems*; IEEE Journal of Lighwave Technology; vol. 17; No. 11; Nov. 1999; pp. 2235-2248.

Wang et al.; *Multi-Gb/s Silicon Bipolar Clock Recovery IC*; IEEE Journal on Selected Areas in Communications; vol. 9, No. 5; Jun. 1991; pp. 656-663.

Webb, William T.; *Spectrum Efficiency of Multilevel Modulation Schemes in Mobile Radio Communications*; IEEE Transactions on Communications; vol. 43, No. 8; Aug. 1995; pp. 2344-2349.

Wedding et al.; *Multi-Level Dispersion Supported Transmission at 20 Gbit/s Over 45 km Installed Standard Singlemode Fibre*; 22$^{nd}$ European Conference on Optical Communication; 1996; pp. 91-94.

Wedding et al.; *Fast Adaptive Control for Electronic Equalization of PMD*; Optical Society of America; (2000); pp. TuP4-1-TuP4-3.

Weger et al.; *Gilbert Multiplier as an Active Mixer with Conversion Gain Bandwidth of up to 17GHz*; Electronics Letters; Mar. 28, 1991; vol. 27, No. 7; pp. 570-571.

Westphal et al.; *Lightwave Communications*; 1994; Thursday Afternoon/CLEO '94; pp. 337-338.

Williamson et al., *Performance Analysis of Adaptive Wideband Duplexer*; 2003 Australian Telecommunications, Networks and Applications Conference (ATNAC); Dec. 8-10, 2003.

Wilson et al.; *Predistortion of Electroabsorption Modulators for Analog CATV Systems at 1.55 μm*; Journal of Lightwave Technology; vol. 15, No. 9; Sep. 1997; pp. 1654-1662.

\* cited by examiner

METHOD AND SYSTEM FOR REDUCING SIGNAL INTERFERENCE

CROSS REFERENCE TO RELATED APPLICATIONS

This application claims the benefit of priority to U.S. Provisional Patent Application Ser. No. 60/635,817, entitled "Electromagnetic Interference Wireless Canceller," filed on Dec. 14, 2004 in the name of Gebara et al.

This application further claims the benefit of priority to U.S. Provisional Patent Application Ser. No. 60/689,467, entitled "Automatic Gain and Phase Control for an Interference Cancellation Device," filed on Jun. 10, 2005 in the name of Kim et al.

This application further claims the benefit of priority to U.S. Provisional Patent Application Ser. No. 60/696,905, entitled "Control Loop for Active Noise Canceller in Wireless Communication System," filed on Jul. 6, 2005 in the name of Schmukler et al.

This application further claims the benefit of priority to U.S. Provisional Patent Application No. 60/719,055, entitled "Method and System for Embedded Detection of Electromagnetic Interference," filed on Sep. 21, 2005 in the name of Stelliga et al.

This application further claims the benefit of priority to U.S. Provisional Patent Application No. 60/720,324, entitled "Method and System for Reducing Power Consumption in an Interference Cancellation Device of a Wireless System," filed on Sep. 23, 2005 in the name of Stelliga et al.

The entire contents of each of the above listed priority documents are hereby incorporated herein by reference.

FIELD OF THE INVENTION

The present invention relates to the field of communications, and more specifically to improving signal fidelity in a communication system by compensating for interference that occurs between two or more communication channels.

BACKGROUND

Electro-Magnetic Interference ("EMI") is a major concern in wireless communication systems. These systems transmit and receive electromagnetic ("EM") signals to communicate data. Examples of such systems include mobile phones, wireless data networks (e.g. networks conforming to IEEE standards 802.11a/b/g/n), and global position systems/sensors ("GPSs"). EMI can become a problem when high-speed circuitry is routed in close proximity to a radio receiver. In particular, a high-speed signal can cause the emission of EMI, and when such a signal is routed in close proximity to a radio receiver, the receiver can undesirably receive the interference along with the intended received radio signal, termed the "victim" signal. The signal that imposes the interference can be termed the "aggressor" or "aggressing" signal. Thus, EMI often degrades the signal fidelity of the victim signal and impairs the quality of the radio reception. Exemplary sources of interference sources can include, among others, a high-speed bus carrying data from a processor to a high-resolution display and a high-speed bus carrying data from a camera imaging sensor to a processor.

As an example, FIG. 1 illustrates the interference phenomenon in a mobile phone system 100 (along with a solution discussed below, in the form of an exemplary embodiment of the present invention), where a general/global system for mobile communications ("GSM") radio receiver 105 can be aggressed by one or more interference sources. Specifically, FIG. 1 illustrates two such exemplary EMI sources 110, 120, each emitting and/or receiving interference 150. One EMI source is a high-speed bus 120 carrying data from a digital signal processing ("DSP") chip 135 to a high-resolution display 140. The other EMI source is a high-speed bus 110 carrying data from a camera imaging sensor 145 to the DSP chip 135. The camera imaging sensor 145 could comprise lenses coupled to a charge coupled device ("CCD"), for example.

Increasing the data rate or bandwidth of each lane, conductor, or channel of the display and camera busses 110, 120 is often desirable. This desire may be motivated by (i) a need to support higher display/camera resolution, which entails faster throughput commensurate with increasing the number of image pixels and/or (ii) a desire to reduce the number of data lanes in the bus 110, 120, thereby involving an increase in the data rate on the remaining lanes to support the existing aggregate throughput. Thus, improvements in the display 140 or camera system 145 (e.g. higher resolution or condensed communication bus) can degrade the performance of the radio receiver 105 in the mobile phone system 100.

Furthermore, it may be desired to improve the radio reception of mobile phones, such as cellular phones, with existing display/camera and bus technologies, i.e. to facilitate reception of weak radio signals. In other words, improving reception of low-power signals or noisy signals provides another motivation to reduce or to otherwise address interference 150 or crosstalk. A weak radio signal might have less intensity than the noise level of the EMI 150, for example. Thus, it is desired to reduce the EMI 150 to facilitate reception of weaker radio signals or to enable operating a mobile phone or other radio in a noisy environment.

High-speed busses 110, 120 emitting, carrying, providing, imposing, and/or receiving interference can take multiple forms. For instance, in the mobile phone application described above, the bus 120 carrying the display data is often embodied as a "flex cable" which is sometimes referred to as a "flex circuit" or a "ribbon cable." A flex cable typically comprises a plurality of conductive traces or channels (typically copper conductors) embedded, laminated, or printed on in a flexible molding structure such as a plastic or polymer film or some other dielectric or insulating material.

FIG. 2 illustrates several flex cables 200 any of which could comprise the data busses 110, 120 inside a mobile phone or another electronic device. (As discussed in more detail below, those flex cables 200 can be adapted to comprise an exemplary embodiment of the present invention.) The high-speed buses 110, 120 may also take the form of a plurality of conductive traces routed on a rigid dielectric substrate or material, such as circuit traces printed on, deposited on, embedded in, or adhering to a circuit board ("PCB").

EMI 150 can also become problematic when two or more radio services are operated on the same handset. In this situation, the transmitted signal for a first radio service may interfere with the received signal for a second radio service. Such interference can occur even when two or more services utilize different frequency bands as a result of (i) the transmitted power of the first signal being significantly larger than the received power of the second signal and/or (ii) limited or insufficient suppression of sidebands in practical radio implementations. Consequently, a small fraction of the first, transmitted signal can leak into the second, received signal as interference.

A third source of EMI 150 can be circuits or circuit elements located in close proximity to a victim channel or radio. Like the signals on the high-speed buses 110, 120, signals flowing through a circuit or circuit component can emit EMI 150. Representative examples of circuit elements that can emit a problematic level of EMI 150 include voltage controlled oscillators ("VCOs"), phased-lock loops ("PLLs"), amplifiers, and other active or passive circuit components (not an exhaustive list).

One technique for actively addressing signal interference involves sampling the aggressor signal and processing the acquired sample to generate an emulation of the interference, in the form of a simulated or emulated interference signal. A canceller circuit subtracts the emulated interference signal from the received victim signal (corrupted by the interference) to yield a compensated or corrected signal with reduced interference.

Conventional technologies for obtaining a representative sample of the aggressor signal, or of the interference itself, are frequently inadequate. Sampling distortion or error can lead to a diminished match between the interference and the emulation of the interference. One technique for obtaining a sample of the aggressor signal is to directly tap the aggressor line. However, the resulting loss of power on the transmitted aggressor line is detrimental in many applications, such as in hand-held radios, cell phones, or handset applications. Directly tapping into the aggressor line can also adversely impact system modularity.

The interference sampling system should usually be situated in close proximity to the source or sources of interference. This configuration helps the sampling system sample the interference signals while avoiding sampling the radio signal. Inadvertent sampling of the radio signal could result in the canceller circuit removing the victim radio signal from the compensated signal, thereby degrading the compensated signal. In other words, conventional technologies for obtaining an interference sample often impose awkward or unwieldy constraints on the location of the sampling elements.

For handset applications, the sampling system should be compatible with the handset architecture and its compact configuration. Radio handsets, such as mobile phones, typically contain numerous components that design engineers may struggle to integrate together using conventional technologies. Strict placement requirements of conventional interference sampling systems frequently increase system design complexity. In other words, conventional interference sampling systems often fail to offer an adequate level of design flexibility as a result of positioning constraints.

Another shortcoming of most conventional technologies for active EMI cancellation involves inadequate management of power consumption. An active EMI cancellation system may consume an undesirably high level of electrical power that can shorten battery life in handset applications. That is, EMI cancellation technology, when applied in a cellular telephone or another portable device, often draws too much electricity from the battery or consumes too much energy from whatever source of energy that the portable device uses. Consumers typically view extended battery life as a desirable feature for a portable wireless communication product. Thus, reducing power consumption to extend usage time between battery recharges is often an engineering goal, mandate, or maxim.

To address these representative deficiencies in the art, what is needed is an improved capability for addressing, correcting, or canceling signal interference in communication systems. A need also exists for a compact system for sampling an aggressor signal and/or associated interference in a communication system, such as a cellular device. A further need exists for an interference sampling system that affords an engineer design modularity and/or flexibility. Yet another need exists for a system that reduces or suppresses signal interference while managing power consumption. A capability addressing one or more of these needs would support operating compact communication systems at high data rates and/or with improved signal fidelity.

SUMMARY OF THE INVENTION

The present invention supports compensating for signal interference, such as EMI or crosstalk, occurring between two or more communication channels or between two or more communication elements in a communication system. Compensating for interference can improve signal quality or enhance communication bandwidth or information carrying capability.

A communication signal transmitted on one communication channel can couple an unwanted interference signal onto a second communication channel and interfere with communication signals transmitting on that second channel. Either channel or each of the channels can comprise a transmission line, an electrical conductor or waveguide, a bus, a medium that provides a signal path, or an active or passive circuit element such as a filter, oscillator, diode, or amplifier (not an exhaustive list). Thus, a channel can be a GSM device, a processor, a detector, a source, a diode, a circuit trace, or a DSP chip, to name a few possibilities.

In addition to occurring between two channels, the interference effect can couple between and among three or more communication channels, with each channel imposing interference on two or more channels and receiving interference from two or more channels. A single physical medium, such as a single segment of wire, can provide a transmission medium for two or more channels, each communicating digital or analog information. Alternatively, each channel can have a dedicated transmission medium. For example, a circuit board or flex cable can have multiple conductors in the form of circuit traces, in which each trace provides a distinct communication channel.

In one aspect of the present invention, a sensor can be disposed in the proximity of one or both channels to obtain a sample or representation of the interference and/or the aggressor signal that produced, induced, generated, or otherwise caused the interference. The sensor can comprise a sensing or sampling channel that obtains the sample. As an aggressor channel transmits communication signals, such as digital data or analog information, producing interference on a victim channel, the sensing channel can sample the aggressing communication signals and/or the interference. The sensing channel can be, for example, a conductor dedicated to obtaining a representation of the aggressing signal or the interference. Such a sensing conductor can be near a conductor carrying aggressing signals, near a conductor carrying victim signals, or in an EM field associated with the aggressing channel and/or the victim channel. The sensing conductor can be physically separated from the aggressing conductor while coupling to the aggressing conductor via an inductive field, a magnetic field, an electrical field, and/or an EM field. That is, the sensing conductor can obtain a sample of the aggressor signal without necessarily physically contacting or directly touching the aggressor conductor, for example.

In another aspect of the present invention, a circuit that cancels, corrects, or compensates for or otherwise address communication interference can have at least two modes of operation. The interference compensation circuit could be coupled to the sensor, for example. In the first mode, the interference compensation circuit can generate, produce, or provide a signal that, when applied to a communication signal, reduces interference associated with that communication signal. In the second mode, the interference compensation circuit can refrain from producing or outputting the interference correction signal. The second mode can be viewed as a standby, idle, passive, sleep, or power-saving mode. Operating the interference compensation circuit in the second mode can offer a reduced level of power consumption.

The discussion of addressing interference presented in this summary is for illustrative purposes only. Various aspects of the present invention may be more clearly understood and appreciated from a review of the following detailed description of the disclosed embodiments and by reference to the drawings and claims.

Figure 1:
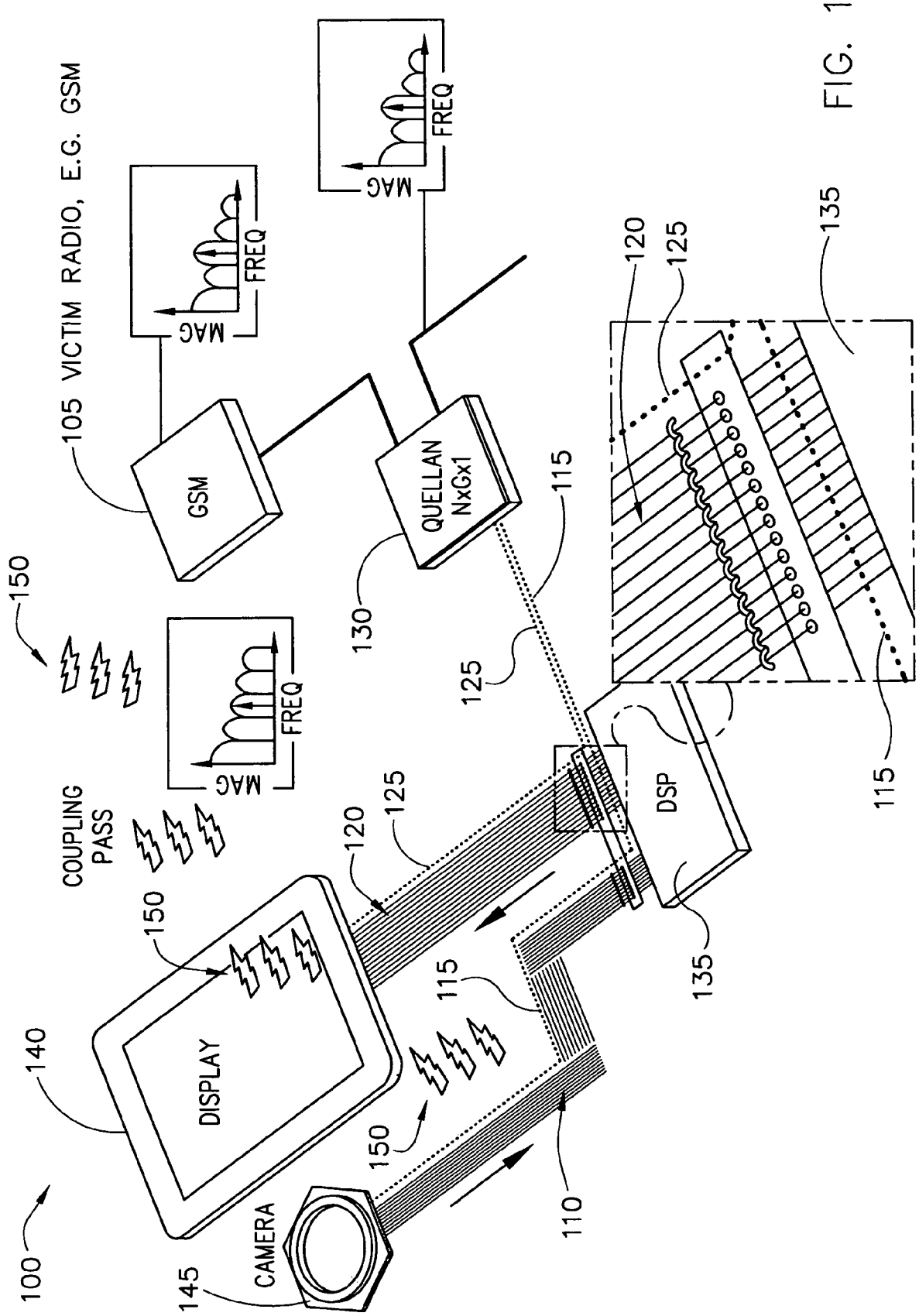
FIG. 1 illustrates a functional block diagram of a communication system comprising an interference sensor coupled to an interference compensation circuit according to an exemplary embodiment of the present invention.

Many aspects of the invention can be better understood with reference to the above drawings. The components in the drawings are not necessarily to scale, emphasis instead being placed upon clearly illustrating the principles of exemplary embodiments of the present invention. Moreover, in the drawings, reference numerals designate corresponding, but not necessarily identical, parts throughout the different views.

DETAILED DESCRIPTION OF EXEMPLARY EMBODIMENTS

The present invention supports canceling, correcting, addressing, or compensating for interference, EMI, or crosstalk associated with one or more communication paths in a communication system, such as a high-speed digital data communication system in a portable radio or a cellular telephone. An interference sensor can obtain a signal representation or a sample of a communication signal that imposes interference or of the interference. The interference sensor can be integrated into a structure, such as a flex circuit or a circuit board, that supports or comprises at least one conductor that imposes or receives the interference. In an exemplary embodiment, the interference sensor can be a dedicated conductor or circuit trace that is near an aggressor conductor, a victim conductor, or an EM field associated with the EMI. The sensor can be coupled to an interference compensation circuit. The interference compensation circuit can have at least two modes of operation. In the first mode, the circuit can actively generate or output a correction signal. In the second mode, the circuit can withhold generating or outputting the correction signal, thereby conserving power and/or avoiding inadvertently degrading the signal-to-noise ratio of the involved communication signals.

Turning to discuss each of the drawings presented in FIGS. 1-8, in which like numerals indicate like elements, an exemplary embodiment of the present invention will be described in detail.

Figure 2:
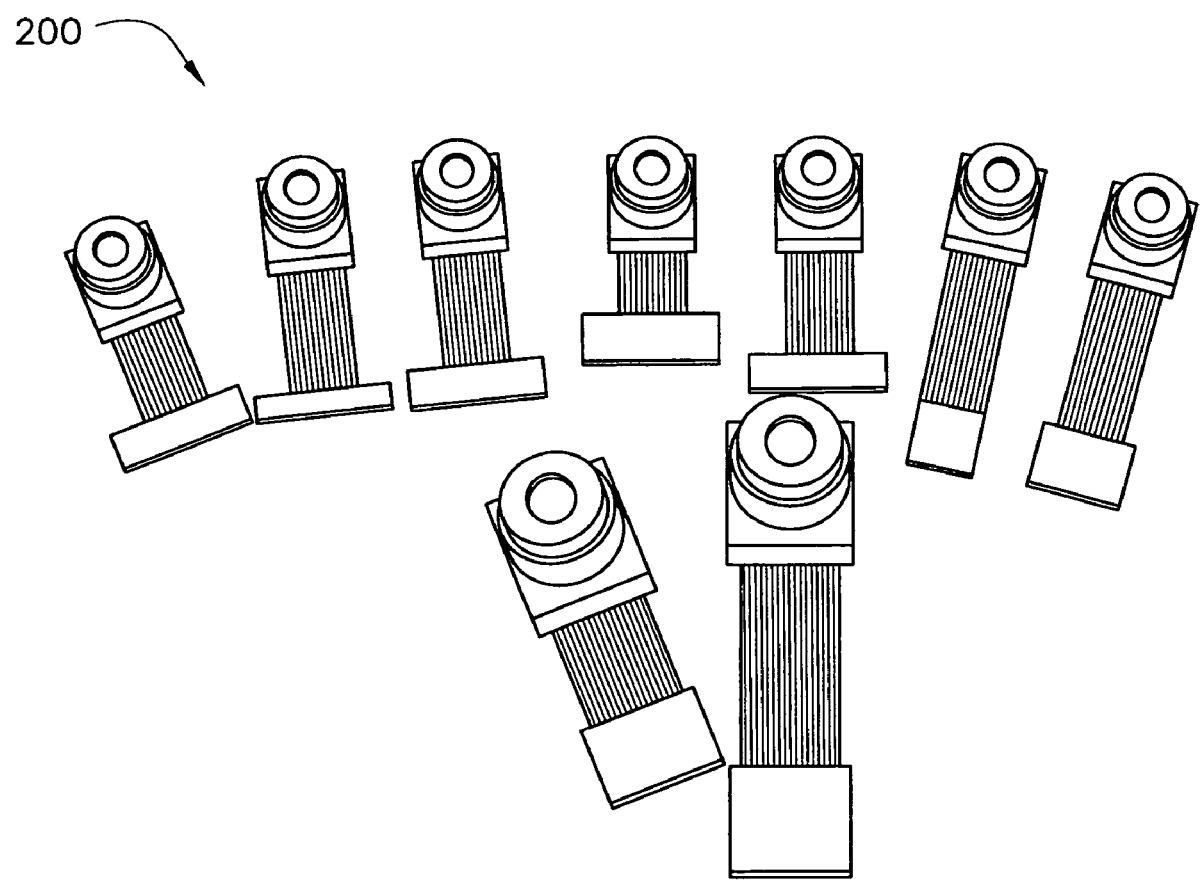
FIG. 2 illustrates flex circuits that can comprise an integral interference sensor according to an exemplary embodiment of the present invention.

Referring now to FIGS. 1 and 2, FIG. 1 illustrates a functional block diagram of a communication system 100 comprising an interference sensor 115, 125 coupled to an interference compensation circuit 130 according to an exemplary embodiment of the present invention. FIG. 2 illustrates flex cables or flex circuits that can comprise one or both of the data buses 110, 120 illustrated in FIG. 1 and that can be adapted in accordance with an exemplary embodiment of the present invention to comprise an interference sensor. In an exemplary embodiment, a cellular telephone or some other portable wireless device can comprise the communication system 100.

A DSP chip 135 connects to a display 140 and a camera 145 via two data busses 110, 120 or channels. Digital data flowing on the data busses 110, 120 causes, induces, and/or is the recipient of interference 150, such as EMI. Beyond the data busses 110, 120, a channel receiving or causing interference can comprise the display 140, and/or the radio system 105. As will be appreciated by those skilled in the art, the victim radio system 105 handles communication signals in connection with transmission over a wireless network.

In an exemplary embodiment, a flex circuit 200, as illustrated in FIG. 2, comprise the data busses 110, 120. The flex circuit 200 typically comprises a polymer, plastic, or dielectric film that is flexible and further comprises conductive circuit traces deposited on or adhering to the film substrate. Conductors can be laminated between two pliable films, for example. The data buses 110, 120 can be embodied in one or more ribbon cables.

The communication system 100 comprises an interference compensation or correcting circuit 130, depicted in the exemplary form of an integrated circuit 130. The interference compensation circuit 130, described in further detail below, delivers an interference compensation signal into or onto a channel that is a recipient of interference, to cancel or otherwise compensate for the received interference. The interference compensation signal is derived or produced from a sample of an aggressor communication signal that is propagating on another channel, generating the crosstalk.

The interference compensation circuit 100 can be coupled between the channel 110, 120 that generates the interference 150 and the device 105 that receives the interference 150. In this configuration, the interference compensation circuit 130 can sample or receive a portion of the signal that is causing the interference and can compose the interference compensation signal for application to the victim device 105 that is impacted by the unwanted interference 150. In other words, the interference compensation circuit 110, 120 can couple to the channel 110, 120 that is causing the interference 150, can generate an interference compensation signal, and can apply the interference compensation signal to the recipient 105 of the interference to provide interference cancellation, compensation, or correction.

A battery, not shown on FIG. 1, typically supplies energy or power to the interference compensation circuit 130 as well as the other components of the system 100. As an alternative to a battery, a fuel cell or some other portable or small energy source can supply the system 100 with electricity. As discussed in more detail below, the system 100 and specifically the interference compensation circuit 130 can be operated in a manner that manages battery drain.

The interference compensation circuit 130 can generate the interference compensation signal via a model of the interference effect. The model can generate the interference compensation signal in the form of a signal that estimates, approximates, emulates, or resembles the interference signal. The interference compensation signal can have a waveform or shape that matches the actual interference signal. A setting or adjustment that adjusts the model, such as a set of modeling parameters, can define characteristics of this waveform.

The interference compensation circuit 130 receives the signal that is representative of the aggressor signal (or alternatively of the interference itself) from a sensor 115, 125 that is adjacent one or both of the data busses 110, 120. In an exemplary embodiment, the sensor 115, 125 comprises a conductor, associated with one or both of the data bus channels 110, 120, that is dedicated to obtaining a sample of the aggressor signal. For example, the data bus 110 can have a plurality of conductors that transmit data between the camera 145 and the DSP chip 135 and at least one other conductor that senses, sniffs, or samples the aggressor signal, or an associated EM or EMI field, rather carrying data for direct receipt. For example, one of the data bus conductors can function as a sensor during a time interval when that specific conductor is not conveying purposeful data.

In an exemplary embodiment, the sensor 115, 125 is integrated into a common structure to which the conductors of the data bus 110, 120 adhere or are attached. For example, the sensor 115, 125 can be attached to a flex cable 200. In one exemplary embodiment, the sensor 115, 125 comprises a conductive trace deposited on the flex cable 200. In one exemplary embodiment, the sensor 115, 125 couples to the communication signals propagating on the data bus 110, 120 via the EM field of those signals. For example, the coupling can be via induction rather than through a direct contact that could transmit direct current ("DC") energy or signals below a threshold frequency. Thus, the sensors 115, 125 can be isolated from the aggressor channel below a threshold frequency and coupled to the aggressor channel above a threshold frequency.

The sensor 115, 125 can be formed into or integrated with the flex cable 200 at the time that the flex cable 200 is manufactured, for example as a step in a manufacturing process that involves lithography. The flex cable 200 can alternatively be adapted following its manufacture, for example by adhering the sensor to the flex cable 200. That is, a conventional flex cable can be acquired from a commercial vendor and processed to attach the sensor 115, 125 to that cable.

In one exemplary embodiment of the present invention, the sensor 115, 125 comprises an interference sampler located in close proximity to an interference source. In another exemplary embodiment of the present invention, the interference compensation circuit 130 samples its reference signal from a conductor that is in the vicinity of a victim antenna. In yet another exemplary embodiment of the present invention, the interference sensor 115, 125 comprises a sampling mechanism embedded as a lane within the bus path 110, 120 of the interference source. For example, the sampling mechanism can comprise an additional conductive line running parallel to the other data lines in a flex cable, or in a rigid printed circuit board. Embedding the sampling mechanism can provide compact size, design flexibility, modularity, signal integrity, and minimal power draw from the sensed line, which are useful attributes for a successful sampling mechanism and EMI canceller or interference cancellation/compensation system.

Embedding or integrating the sensor 115, 125 or sampling mechanism in a unitary, monolithic, or integrated structure that comprises the bus path 110, 120 provides close proximity between the sensor 115, 125 and the interference source or sources. The resulting close proximity facilitates strong sampling of the interference relative to the radio signal.

Embedding or integrating the sensor 115, 125 with the bus path 110, 120 offers the system designer (and PCB board designer in particular) design flexibility. For example, the design engineer can be freed from the constraint of allocating board space near the interference source for the sampling mechanism, as would be required for an antenna implementation. The system designer can receive relief from the task of designing an antenna according to one or more specific reception requirements, such as a field pattern and a frequency range.

An integrated- or embedded-sensor solution based on dedicating a conductor 115, 125 of a multi-conductor bus 110, 120 to sensing can have an inherent capability to receive the EMI interference. The inherent receptivity can mirror the inherent emission properties of the other conductors that generate interference. In other words, since emission and reception are typically congruent phenomena, configuring the sensing conductor to have a form similar to the radiating conductor (aggressor) can provide inherent reception of the EMI frequencies of interest.

In one exemplary embodiment of the present invention, the embedded interference sensor 115, 125 can run, extend, or span the entire length of the data bus 110, 120 that has data lines emitting the aggressing EMI.

In one exemplary embodiment of the present invention, an interference sensing conductor 115 can extend a limited portion of the total span of the data bus 110, 120, thereby helping the data bus 110, 120 maintain a compact width. Another exemplary embodiment which can minimize the width of the data bus has the sampling mechanism 115, 125 crossing over or under the data lines 110, 120. The crossing can be a perpendicular crossing. The sensing conductor and the data conductors can form an obtuse angle or an acute angle, for example.

As illustrated in FIG. 1, the sensing conductor 115, 125 can be disposed at a terminal end of the data bus 110, 120. For example, the sensing conductor 115 can comprise a conductive line near the electrical connection ports between the DSP chip 135 and a flex cable 200 that comprises the data bus 110. Such a conductor can extend over, under, and/or around the bus, for example as a conductive band.

In one exemplary embodiment of the present invention, the embedded interference sensor 115 receives EMI interference not only from a primary element, such as its associated data bus 110, but also from other sources on the handset, such as the display 140, the camera 145, the DSP 135, etc. Thus, a single sensor 115 can sample multiple sources of interference to support correcting the interference from two or more sources via that single sensor and its associated interference compensation circuit 130.

In one exemplary embodiment of the present invention, the interference compensation circuit 130 samples its reference signal (i.e. the aggressor source) from a conducting element 115, 125 that receives radiated EMI 150. This sampling approach can sense the EMI 150 (or a filtered version thereof), or the aggressor signal in a non-intrusive manner. Specifically, the aggressor data line/source can remain essentially undisturbed physically. The data bus 110, 120 can function with little or no loss of power associated with the sensor 115, 125 inductively coupled thereto, typically without physical contact or direct electrical contact. That is, a dielectric material can separate the sensing conductor 115, 125 from the aggressor conductor, while providing inductive or EM coupling.

After sampling the reference signal, the interference compensation circuit 130 generates a compensation or cancellation signal which is adjusted in magnitude, phase, and delay such that it cancels a substantial portion of the interference signal coupled onto the victim antenna. In other words, the reference signal, which comprises the sample, is filtered and processed so it becomes a negative of the interference signal incurred by the received victim signal. The parameters of the magnitude, phase, and delay adjustment are variable and can be controlled to optimize cancellation performance.

Figure 3:
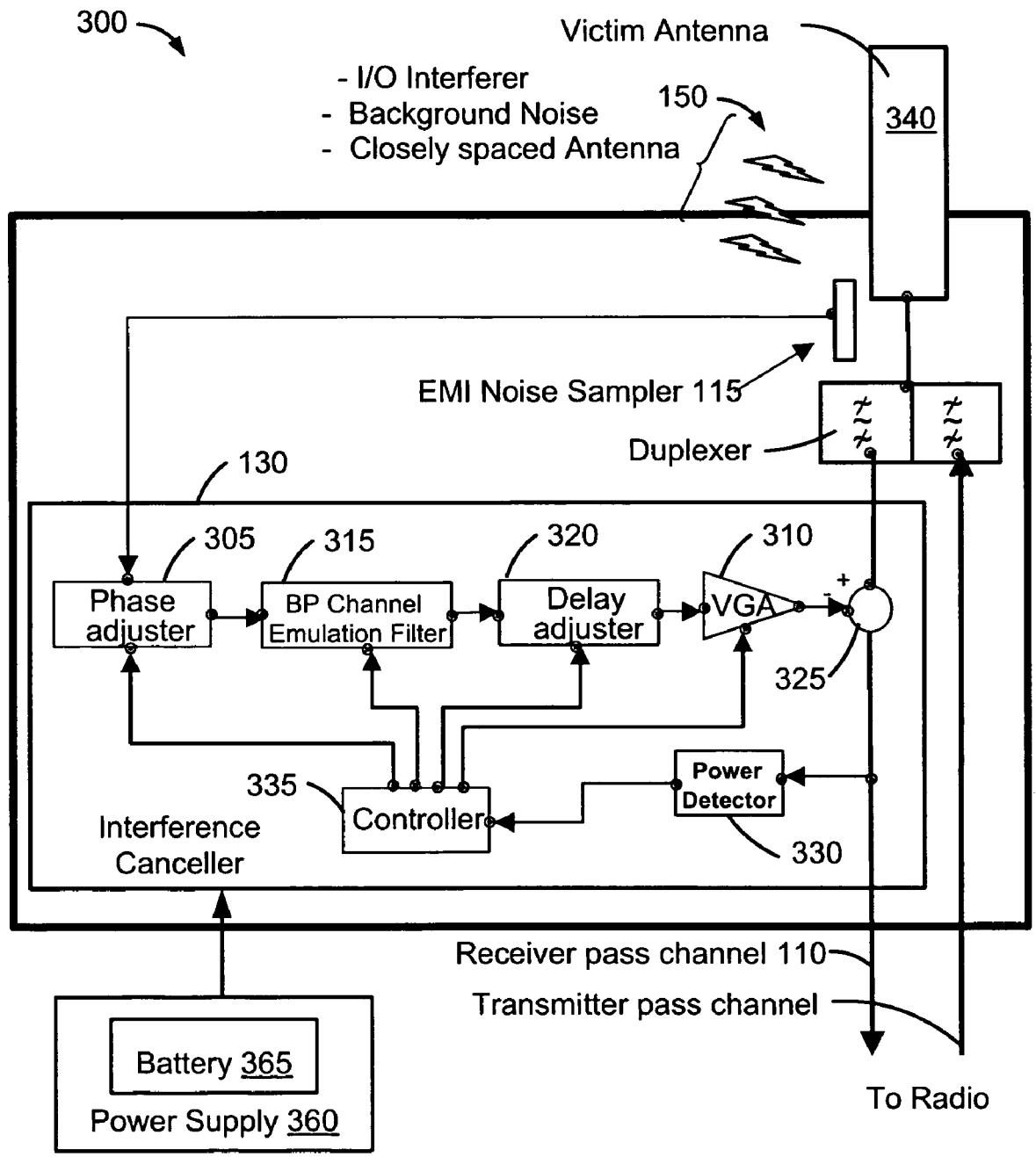
FIG. 3 illustrates a functional block diagram of an interference compensation circuit according to an exemplary embodiment of the present invention.

Turning now to FIG. 3, this figure illustrates a functional block diagram of an interference compensation circuit 130 according to an exemplary embodiment of the present invention. The interference compensation circuit 130 shown in FIG. 3 can be embodied in a chip format as an integrated circuit ("IC"), as illustrated in FIG. 1, or as a hybrid circuit. Alternatively, the interference compensation circuit 130 can comprise discrete components mounted on or attached to a circuit board or similar substrate. Moreover, in one exemplary embodiment of the present invention, the system 100 that FIG. 1 illustrates can comprise the system 300 of FIG. 3.

The interference compensation circuit 130 draws or obtains power or energy from the power supply 360, and its associated battery 365. As will be discussed in further detail below, the interference compensation circuit 130 can operate in a plurality of modes, each having a different level of consumption of battery energy.

FIG. 3 illustrates representative function blocks of the interference compensation circuit 130, including a Variable Phase Adjuster 305, a Variable Gain Amplifier ("VGA") 310, an emulation filter 315, a Variable Delay Adjuster 320, a Summation Node 325, a power detector, and a controller 335.

The interference sensor 115 obtains a sample of the aggressor signal via coupling of the interference field, as discussed above, from the receiving channel 110. The sampled reference signal is fed through the compensation circuit 130 starting with the Variable Phase Adjuster 305. The phase adjuster's role is to match, at the summation node 325, the phase of the emulated compensation signal with the phase of the interfering signal coupled onto the victim antenna 340. That is, the phase adjuster 305 places the phase of the compensation signal in phase with respect to the phase of the interference so that, when one is subtracted from the other, the compensation signal cancels the interference. The cancellation occurs at the summation node 325 by subtracting the coupled signal onto the victim antenna 340 from the emulated signal generated by the interference compensation circuit 130 using the sampled reference signal (from the sensor 115).

In an alternative embodiment of the compensation circuit 130, the phase adjuster 305 can adjust the emulated signal phase to be 180 degree out of phase with the interfering coupled signal. In that case, the summation node 325 adds the two signals rather than performing a subtraction.

In one exemplary embodiment, the phase shifter 305 comprises quadrature hybrids, and four silicon hyper-abrupt junction varactor diodes, along with various resistors, inductors and capacitors for biasing, pull-up, and signal conditioning. In another exemplary embodiment, the phase shifter 305 comprises an active circuit.

The emulation filter 315 follows the variable phase shifter 305 in the cancellation path. The emulation filter 315 is typically a band pass ("BP") filter that models the channel coupling and is also tunable in order to compensate for any drifts in channel center frequency.

In one exemplary embodiment, the emulation filter 325 comprises lumped elements and varactor diodes. The varactor diodes help change or control the center frequency of the emulation channel.

In one exemplary embodiment, the emulation filter 325 is a Finite Impulse Filter ("FIR"). The FIR can comprise taps and tap spacings that are extracted from or determined according to the coupling channel characteristics. In order to have robust cancellation for improved signal integrity of the communication system 100, the emulation filter 325 typically should match, in trend, the coupling channel characteristics within the frequency band of interest.

The next component in the cancellation path is the controllable delay adjuster 320, whose main role is to provide a match between the group delay of the coupled signal through the victim antenna 340 and the group delay of the emulated compensation signal at the summation node 325.

The output of the delay adjuster 320 feeds into the VGA 310. The VGA 310 matches the emulated signal's amplitude to the amplitude of the interference signal at the summation node 325. Whereas the emulation filter 315 models the frequency characteristics (i.e. attenuation of frequencies relative to other frequencies) of the coupling channel, the VGA 310 applies a broadband gain, which is constant in magnitude across the frequency band of interest. Thus, the emulation filter 315 and the VGA 310 function collaboratively to match the magnitude of the channel's coupling response on an absolute scale, rather than merely a relative scale.

The VGA 310 feeds the interference compensation signal to the summation node 325. In turn, the summation node 325 applies the compensation signal to the victim channel to negate, cancel, attenuate, or suppress the interference.

In one exemplary embodiment, the summation node 325 comprises a directional coupler. In an alternative exemplary embodiment, the summation node 325 comprises an active circuit such as a summer, which is typically a three-terminal device, or an output buffer, which is typically a two-terminal device.

For best performance, the summation node 325 should introduce essentially no mismatch to the victim antenna signal path. That is, the summation node 325 should ideally maintain the 50-ohm impedance characteristic of the system 130. Nevertheless, in some situations, small or controlled levels of impedance mismatch can be tolerated. Avoiding impedance mismatch implies that the summation node 325 should have a high output impedance at the tap. Additionally, the summation node 325 should not add significant loss to the victim antenna receive path, as such loss can adversely affect receiver sensitivity. For illustrative purposes, this discussion of impedance matching references a system with a characteristic impedance of 50-ohms; however, exemplary embodiments of the present invention can be applied to systems with essentially any characteristic impedance.

While FIG. 3 illustrates the components 305, 310, 315, 320 is a particular order, that order is exemplary and should not be considered as limiting. Moreover, the order of those components 305, 310, 315, 320 is usually not critical and can be changed, or the components 305, 310, 315, 320 can be rearranged, while maintaining acceptable performance of the interference compensation circuit 130.

The interference compensation circuit 130, which can be viewed as an EMI canceller, offers flexibility in that the cancellation or compensation parameters can be adjusted or controlled to optimize the match of the emulated coupling channel to the actual EMI coupling channel. More specifically, the controller 335 and its associated power detector 330 provide a feedback loop for dynamically adjusting the circuit elements 305, 310, 315, 320 in a manner that provides robust correction of interference.

Two methods for controlling these parameters are described in U.S. Provisional Patent Application Ser. No. 60/689,467, entitled "Automatic Gain and Phase Control for an Interference Cancellation Device" and filed on Jun. 10, 2005 in the name of Kim et al. and U.S. Provisional Patent Application Ser. No. 60/696,905, entitled "Control Loop for Active Noise Canceller in Wireless Communication System" and filed on Jul. 6, 2005 in the name of Schmukler et al. The entire contents of U.S. Provisional Patent Application Ser. Nos. 60/689,467 and 60/696,905 are hereby incorporated herein by reference. Thus, an exemplary embodiment of the present invention can comprise any of the technologies, teachings, systems, methods, processes, or disclosures of U.S. Provisional Patent Application Ser. Nos. 60/689,467 and 60/696,905.

Figure 7:
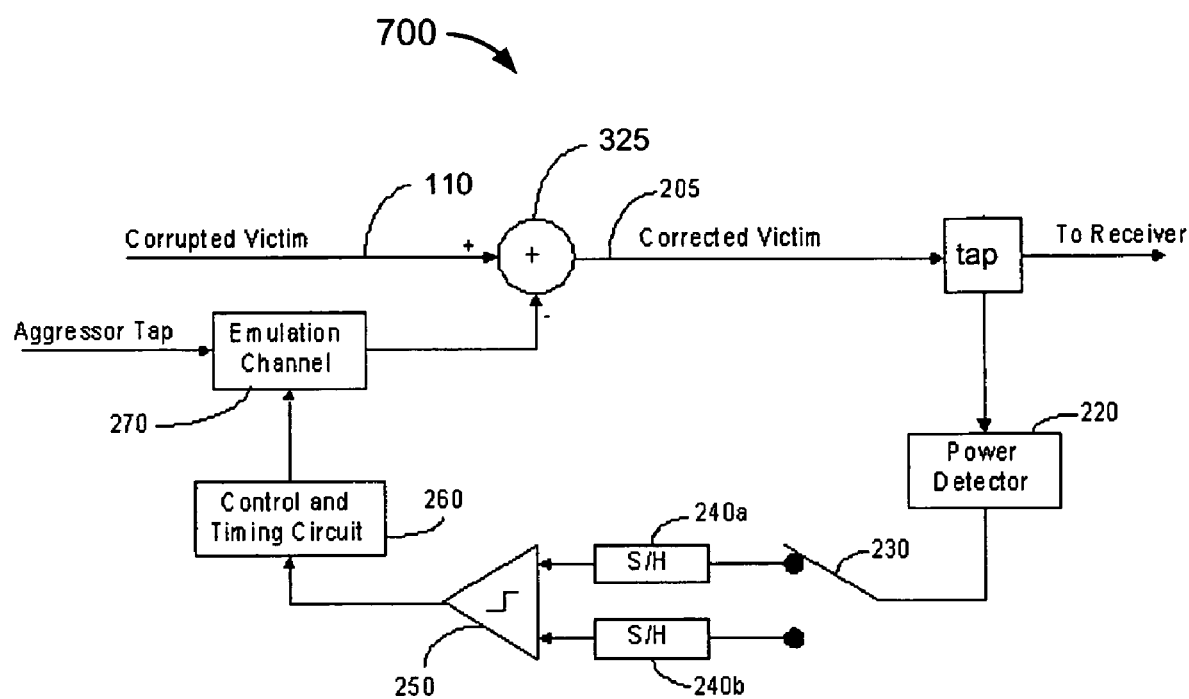
FIG. 7 illustrates an interference compensation circuit that can be coupled to an interference sensor according to an exemplary embodiment of the present invention.

Referring now to FIG. 7, this figure illustrates an interference compensation circuit 700 that can be coupled to an interference sensor 115, 125 according to an exemplary embodiment of the present invention. In other words, in one exemplary embodiment, the system 100 illustrated in FIG. 1 and discussed above can comprise the circuit 700 rather that the circuit 130. U.S. Provisional Patent Application Ser. No. 60/696,905, entitled "Control Loop for Active Noise Canceller in Wireless Communication System" and filed on Jul. 6, 2005 in the name of Schmukler et al. provides additional information about the circuit 700 to supporting using that circuit 700 in an exemplary embodiment of the present. The contents of U.S. Provisional Patent Application Ser. No. 60/696,905 are hereby included herein by reference.

Figure 4:
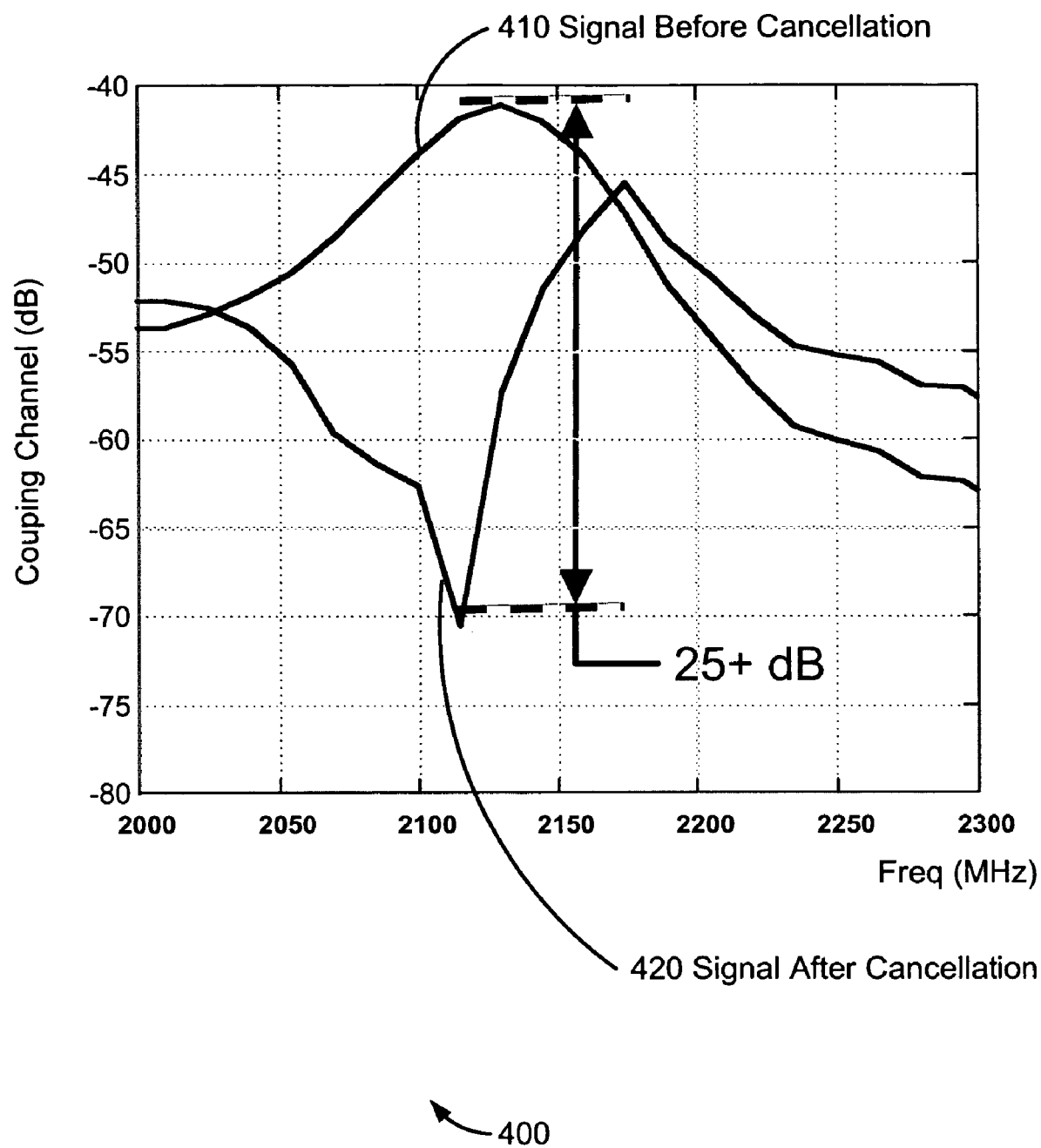
FIG. 4 illustrates a frequency plot of an interference signal prior to interference compensation overlaid on a plot of the interference signal following interference compensation according to an exemplary embodiment of the present invention.

Turning now to FIG. 4, this figure illustrates a frequency plot 410 of an interference signal prior to interference compensation overlaid upon a plot 420 of the interference signal following interference compensation according to an exemplary embodiment of the present invention. That is, the graph 400 illustrates laboratory test data collected before and after an application of interference compensation in accordance with an exemplary embodiment of the present invention.

More specifically, FIG. 4 shows the coupling channel characteristics between a flex cable, similar to the flex cables 200 illustrated in FIG. 2 and discussed above, and a 2.11 gigahertz ("GHz") antenna. The test data shows that, in laboratory testing, an exemplary embodiment of an interference compensation circuit 130 achieved a signal reduction greater than 25 dB in the frequency band between 2.1 GHz and 2.15 GHz.

Figure 5:
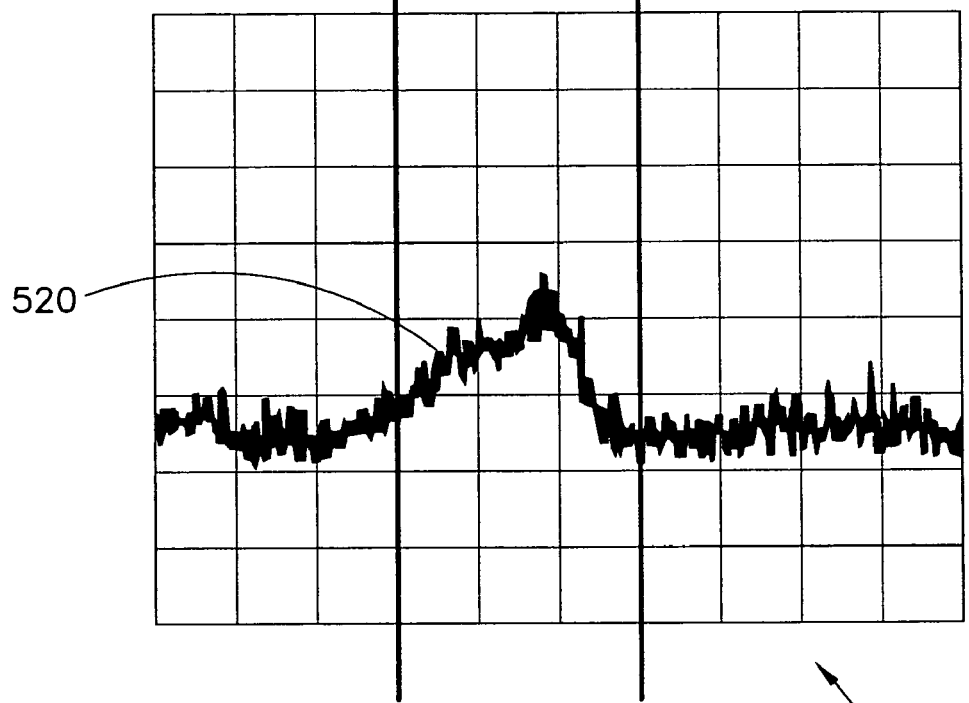
FIG. 5 illustrates a plot of an interference signal prior to application of interference compensation according to an exemplary embodiment of the present invention.
Figure 6:
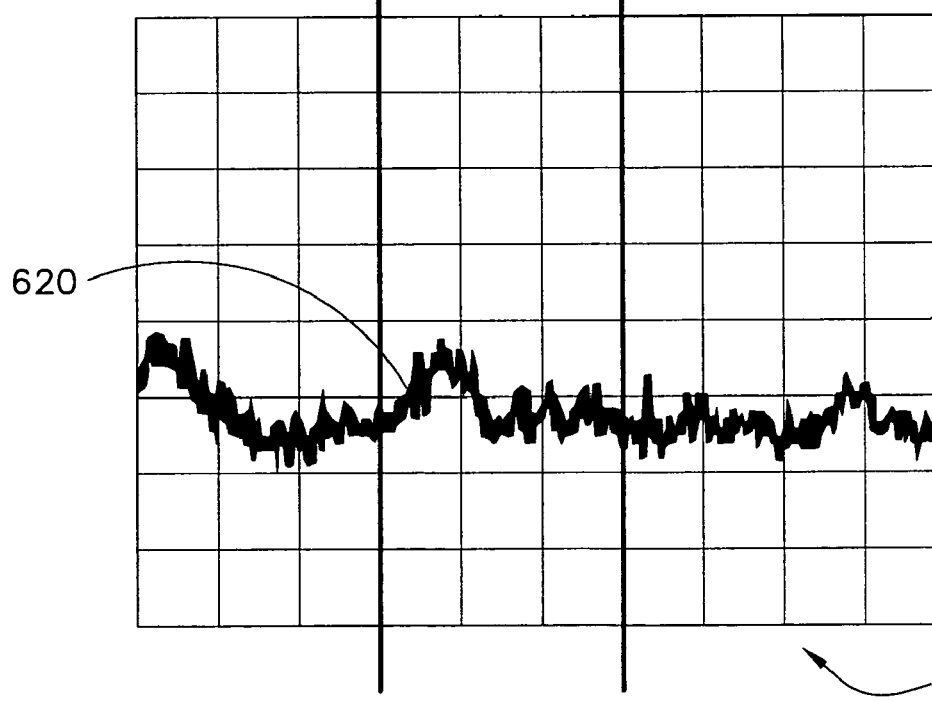
FIG. 6 illustrates a plot of an interference signal following application of interference compensation according to an exemplary embodiment of the present invention.

Turning now to FIGS. 5 and 6, these figures respectively show spectral plots 500, 600 before and after applying interference compensation according to an exemplary embodiment of the present invention. More specifically, the traces 520, 620 of these plots 500, 600 illustrate data obtained in laboratory testing of an interference compensation system in accordance with an exemplary embodiment of the present invention.

The spectra 520, 620 characterize a 450 megabits-per-second ("Mbps") (PRBS-31) interfering signal coupled onto a 2.1 GHz antenna that is in close proximity to a flex cable carrying the 450 Mbps signal. In the frequency band of interest 510, the compensation achieved approximately 12 dB of interference suppression.

Referring now to FIGS. 1, 2, and 3, the interference compensation circuit 130 can function or operate in at least two modes. In one mode, the circuit 130 can consume less power than in the other mode. That is, the interference compensation circuit 130 can transition from an active mode of relatively high power usage to an other mode of relatively low power usage. The other mode can be a standby mode, a power-saving mode, a passive mode, an idle mode, a sleep mode, or an off mode, to name a few possibilities. In that other mode, the interference compensation circuit can draw a reduced level of power, minimal power, essentially no power, or no power at all. Part or all of the interference compensation circuit illustrated in FIG. 3 and discussed above can be disconnected from power in the other mode. An occurrence of one criterion or multiple criteria or conditions can trigger a transition from active compensation to a standby mode. Thus, the transition can occur automatically in response to an event other than a user turning off an appliance, such as a cell phone, that comprises the circuit 130.

In a handset application, operating the interference compensation circuit 130 in a power-saving mode can extend the operation time of a single battery charge, thereby enhancing the commercial attractiveness of the handset. Power reduction can be implemented or achieved without degrading interference compensation performance.

Conditions occur in wireless handset devices that provide an opportunity for reduced power consumption. In particular, many of the EMI sources are not always active and, therefore, are not always emitting interference. In situations in which the interference compensating circuit 130 and its associated controller 335 do not need to apply a compensation signal, the circuit 130 can transition to a sleep or stand-by mode of reduced power consumption. That is, rather than having one or more circuit elements receiving power while not producing an output or actively manipulating signals, power can be removed from those elements or from a selected set of circuit elements.

Thus, in one exemplary embodiment of the present patent invention, the system 100 experiences states in which operating certain components of the interference compensation circuit 130 is unnecessary. In such states, the controller 335 can place those components in a low-power or standby mode or can remove power entirely from those components. For example, when an EMI source is not active for a threshold amount of time, the interference compensation circuit 130 can transition to the standby mode. More specifically, when the bus 110 is not actively carrying data traffic, the interference compensation circuit 130 can switch to the standby mode to conserve battery power.

In one exemplary embodiment, the sensor 115 provides a signal that is indicative of whether the bus 110 is active. That is, the level, voltage, amplitude, or intensity of the signal that the sensor 115 output can provide an indication of whether the bus is actively transmitting aggressor signals.

When appropriate conditions are met, electrical power can be removed from the components 305, 310, 315, 320 that generate the emulated EMI signal. And, power can additionally or optionally be removed from some or all of the circuitry of the control module 335. However, components used to store the emulation characteristics or parameters, i.e. the emulation channel settings that match the coupling channel, can be kept active so as to immediately or quickly restore the interference compensation circuit's emulation channel to its last known state when the EMI source (e.g. the aggressor channel 110) is reactivated. In other words, the memory system of the controller 335 can retain power access to avoid loss of the parametric values stored in memory. Keeping the parametric values in memory facilitates rapid restoration to active cancellation upon reactivation of the EMI source. Thus, recalling the operational settings of the phase adjuster 305, the emulation filter 315, the delay adjuster 320, and the VGA 310 avoids the interference that would occur if the emulation was retrained from an arbitrary reset state following transition from standby mode to active mode.

Operating in the standby mode can comprise either full powering down one or more circuit components and/or operating in a state of reduced power usage. In some instances, the latter may be preferred in order to rapidly bring the component out of the standby state when the EMI source is reactivated.

In one exemplary embodiment of the present invention, a standby signal instructs or triggers the interference compensation circuit 130 to transition to its power-saving or standby state. The standby signal can also trigger the transition from the power-saving or standby state to an active state. A device transmitting the source of the EMI, or an associated power detector, can generate a signal indicating that it is actively transmitting data. For example, the DSP chip 135 that sends data to the display 140 in the mobile phone system 100 can output an binary signal or code to indicate that it not transmitting data and consequently emitting EMI.

As another example, the camera imaging sensor 145 that sends data to a the DSP chip 135 can output a binary signal or a digital code to indicate whether or not it is transmitting data that could produce EMI. As yet another example, a radio device that uses time-division multiplexing can provide the triggering standby signal. Such a radio device can be used in GSM or wideband code division multiple access ("W-CDMA") applications, for example. In this situation, the radio may output a binary signal to mark the time divisions or intervals in which it is transmitting data. During those portions of the duplexing stage, the interference compensation should be active, as the transmitted signal can aggress a second radio device on a wireless handset.

In one exemplary embodiment of the present invention a power detector, such as the detector 330, examines the sampled EMI signal and generates the standby signal based on properties of the sampled EMI signal. For example, a standby state can be set if the detector 330 determines that power of the sampled EMI signal is below a given or predetermined threshold. Conversely, the interference compensation circuit 130 can be activated when the detected power moves above the threshold.

In one exemplary embodiment of the present invention, the standby state can be declared if the time-localized peak amplitude of the sampled EMI signal falls below a given threshold. One advantage of this embodiment is that its implementation does not typically require an extra pin on the device package to be fed a dedicated standby signal. Instead, the standby signal could be derived from an available pin already used for EMI cancellation.

In one exemplary embodiment of the present invention, all the components 305, 310, 315, 320 of the emulation channel that are used to generate the emulated EMI signal from the sensor's sampled EMI source signal can be placed in the low-power standby state. In one exemplary embodiment of the present invention, one or more of the following components are placed in standby mode in response to an occurrence of a standby condition: the phase adjuster 305, the BP channel emulation filter 315, the delay adjuster 320, and the VGA 310. Reducing power consumption of those devices components 305, 310, 315, 320 facilitates significant power savings when the EMI source is inactive.

The controller 335, which can also be referred to as a control module, can be inactive when the EMI source is inactive. With no source of EMI and an inactive controller 335, interference is not typically problematic. More specifically, no EMI occurs, and the emulation path is producing a zero emulation signal. In many circumstances, an improvement in interference performance can result from deactivating the emulation path when no source of EMI is active. If the emulation channel remains active when no EMI source is active, the emulation channel parameters may drift towards a set of values that poorly match the underlying EMI coupling channel. In this situation, activating the EMI source can result in poor tuning that causes the interference compensation circuit 130 to learn new, more effective parameters. In other words, when the interference compensation circuit 130 is inactive, an improperly tuned coupling channel can still produce a zero emulation signal since the sampled EMI source signal will be zero.

In one embodiment of the present invention, all of the components, or essentially all of the active components, of the control module can be placed in the standby state when the standby signal is asserted, thereby providing a high level of power savings.

In one exemplary alternative embodiment of the present invention, the register or memory elements used to store the controllable parameters in the emulation channel are fully powered, while the rest of the control module 335 is deactivated. This embodiment facilitates rapidly or immediately returning the emulation channel to its pre-standby state when the system exits the standby mode. In other words, once the system leaves standby mode, the interference compensation circuit 130 can resume cancellation from a previously-known and accurate channel model, rather than starting the cancellation from an arbitrary reset state. Resuming operation of the interference compensation circuit 130 from an arbitrary set of parameters may take an undesirably long period of time prior to convergence to an accurate channel model. During this learning time, EMI cancellation performance may be insufficient or inadequate.

Referring now to FIG. 7, the interference compensation circuit 700 can operate in two or more modes, one of which offers reduced power consumption relative to the other. In other words, in one exemplary embodiment of the present invention, the circuit 700 transitions to a power-saving mode upon occurrence of a trigger event. In that mode, power can be removed from one or more of the power detector 220, the switching device 230, the sample and hold circuits 240*a* and 240*b*, and the comparator 250. The power detector 220 and comparator 250 are two leading contributors to power consumption, thus disconnecting their power supply can achieve significant power savings. The control and timing circuit 260 typically comprises low-speed digital logic that consumes negligible power. Nonetheless, most of this circuit 260 can be deactivated with the exception of the registers, which store the values of the emulation channel 270 parameters.

Figure 8:
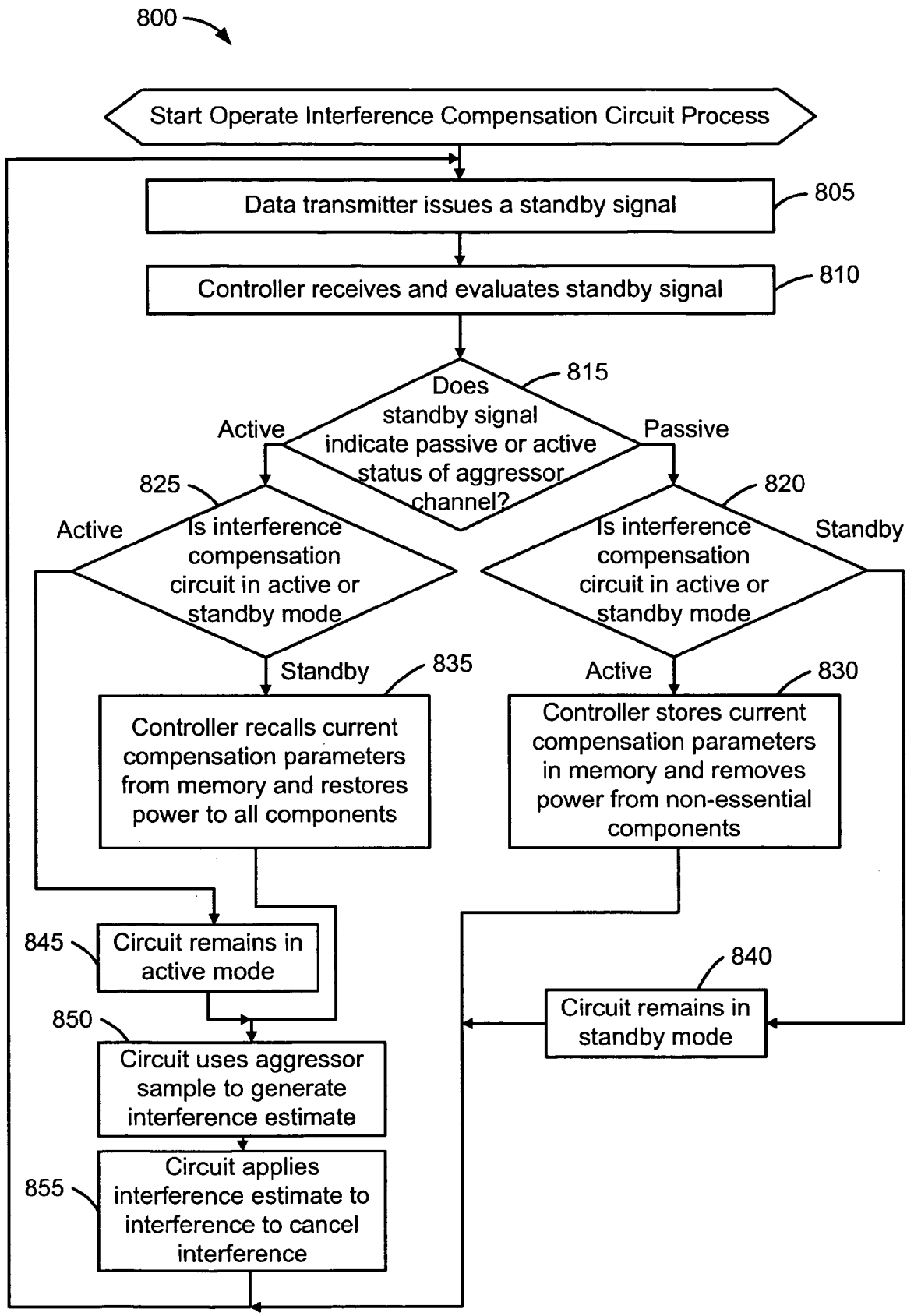
FIG. 8 illustrates a flowchart of a process for operating an interference compensation circuit in a plurality of modes according to an exemplary embodiment of the present invention.

Turning now to FIG. 8, this figure illustrates a flowchart of a process 800 for operating an interference compensation circuit 130 in a plurality of modes in accordance with an exemplary embodiment of the present invention. The Process 800, which is entitled Operate Interference Compensation Circuit, can be viewed as a process for managing power consumption of an interference compensation circuit 130.

At Step 805, a data transmitter, such as the camera 145 or the DSP chip 135 issues a standby signal that can comprise a digital code. The code carries the status of the transmitter, for example whether the transmitter is actively transmitting data or is in a passive state between two time periods of data transmission. In one embodiment, the code specifies whether the transmitter is preparing to actively transmit data or to change between operational states.

At Step 810, the controller 335 receives the standby signal and determines whether the transmitter is in an active state of transmitting data or a passive state. Decision Step 815 branches the flow of Process 800 to Step 825 if the standby signal indicates that the transmitter is active. If, on the other hand, the standby signal indicates that the transmitter is passive, then decision Step 820 follows Step 820.

At decision Step 820, the controller 335 determines whether the interference compensation circuit 130 is in an active mode or is otherwise in a passive mode. If the interference compensation circuit 130 is in an active mode, then Step 830 follows Step 820.

At Step 830, the controller 335 stores the current or present compensation parameters in memory and removes power from the emulation channel components 305, 310, 315, 320. This action places the interference compensation circuit 130 in a standby or power-saving mode. The stored compensation parameters typically comprise the settings of each of the adjustable components 305, 310, 315, 320 of the emulation channel.

If at decision Step 820, the controller 335 determines that the interference compensation circuit 130 is in the standby mode rather than the active mode, then Step 840 follows Step 820. At Step 840, the interference compensation circuit 130 remains in the standby mode.

If decision step 815 branches the flow of Process 800 to Step 825 rather than Step 820 (based on the standby signal indicating active data transmission), then at decision Step 825, the controller 335 determines whether the interference compensation circuit 130 is in active mode or standby mode.

If the interference compensation circuit 130 is in active mode, then Step 845 follows Step 825. At Step 845, the interference compensation circuit 130 remains in active mode.

If the controller 335 determines at decision Step 825 that the interference compensation circuit 130 is in standby mode rather than active mode, then Step 835 follows Step 825. At Step 835, the controller 335 recalls the current or last-used compensation parameters from memory and restores power to the powered-down components. Restoring power typically comprises initializing each of the adjustable components 305, 310, 315, 320 of the emulation channel with the parametric settings recalled from memory.

Step 850 follows execution of either of Steps 835 and 845. At Step 850, the interference compensation circuit 130 generates an estimate of the interference based on processing the aggressor sample, which the sensor 115 obtained. As discussed above with reference to FIG. 3, the emulation channel components 305, 310, 315, 320 process the sample to output the interference estimate.

At Step 855, the interference compensation circuit 130 applies the interference estimate to the victim channel to cancel, suppress, or correct the interference occurring thereon.

Following execution of any of Steps 830, 840, and 855, Process 800 loops back to and executes Step 805 as discussed above. Execution of Process 800 continues following the loop iteration.

In summary, a system in accordance with an exemplary embodiment of the present invention can comprise a sensor that obtains a representative interference sample or a sample of an interfering signal. A system in accordance with an exemplary embodiment of the present invention can alternatively, or also, comprise a circuit that operates in two or more modes to cancel, correct, or compensate for interference imposed on one communication signal by another signal. The system can be applied to wireless communication devices, such as cell phones, personal data assistants ("PDAs"), etc. However, those skilled in the art will appreciate that the present invention is not limited to the described applications and that the embodiments discussed herein are illustrative and not restrictive. Furthermore, it should be understood that various other alternatives to the embodiments of the invention described here may be recognized by those skilled in the art upon review of this text and the appended figures. Such embodiments may be employed in practicing the invention. Thus, the scope of the present invention is intended to be limited only by the claims below.

What is claimed is:

1. A system for handling communication signals, comprising a flex circuit that comprises:
   a first channel, operative to transmit first communication signals;
   a second channel, coupled to the first channel via an interference effect, operative to receive second communication signals and to receive interference from the first transmitted communication signals via the interference effect; and
   a sensor, electrically isolated from the first channel, operative to sense the first communication signals for input to an interference compensation circuit,
   wherein the first channel comprises a first conductor attached to a substantially planar substrate and extending along a planar surface thereof,
   wherein the second channel comprises a second conductor attached to the substantially planar substrate and extending along the planar surface thereof,
   wherein the sensor comprises a third conductor attached to the substantially planar substrate, extending along the planar surface thereof, and separated from each of the first conductor and the second conductor, and
   wherein the third conductor comprises a conductive segment extending alongside and substantially parallel to the first conductor, the conductive segment operative to receive a signal sample from the first conductor via coupling to an electromagnetic field of the first conductor.

2. The system of claim 1, wherein the sensor is isolated from the first channel below a threshold frequency and coupled to the first channel above the threshold frequency.

3. The system of claim 1, wherein the system comprises the interference compensation circuit, and wherein the interference compensation circuit is operative to function in an active mode for applying interference compensation and a standby mode.

4. The system of claim 1, wherein the system further comprises a power source connected to the interference compensation circuit, and
   wherein the interference compensation circuit is operative to operate in each of an active mode and a passive mode and to obtain more power from the power source in the active mode than in the passive mode.

5. The system of claim 1, further comprising the interference compensation circuit,
   wherein the interference compensation circuit is operative in a first mode to output an interference compensation signal based on the sensed first communication signals, and wherein the interference compensation circuit is operative in a second mode to suspend outputting the interference compensation signal while consuming at least some power.

6. The system of claim 1, wherein the third conductor is adjacent the first conductor and is dedicated to sampling the first communication signals from the first conductor.

7. The system of claim 6, wherein the first conductor and the second conductor are embedded in a sheet of dielectric material, and
wherein the third conductor is essentially isolated from the first conductor in one electromagnetic frequency range and coupled to the first conductor in another electromagnetic frequency range.

8. The system of claim 1, where the sensor is adjacent the first conductor.

9. The system of claim 1, wherein the first conductor and the second conductor are disposed on a flexible film.

10. The system of claim 1, wherein the second conductor is disposed across the first conductor.

11. The system of claim 1, wherein the first channel comprises a data bus,
wherein the second channel comprises a radio antenna, and
wherein the sensor is a lane of the data bus that is dedicated to sensing.

12. The system of claim 1, wherein the first communication signals comprise digital signals,
wherein the second communication signals comprise wireless signals, and
wherein the system further comprises:
an imaging device operably connected to the first channel and operative to communicate the digital signals via the first channel; and
a receiver operably connected to the second channel and operative to process the wireless signals.

13. The system of claim 1, wherein the sensed first communication signals have intensity, and
wherein the interference compensation circuit is operative to output an interference correction signal in response to a determination that the intensity is above a threshold and to suspend outputting the interference correction signal in response to a determination that the intensity is below the threshold.

14. The system of claim 1, wherein the interference compensation circuit comprises an integrated circuit that is operative to produce an interference correction signal in response to processing the sensed first communication signals.

15. A system for handling communication signals, comprising:
a first electrically conductive trace disposed on a flex circuit, operative to transmit first communication signals;
a second electrically conductive trace, coupled to the first electrically conductive trace via an interference effect, operative to transmit or receive second communication signals and to receive interference from the first transmitted communication signals via the interference effect; and
a sensor comprising a third electrically conductive trace, disposed on the flex circuit substantially adjacent to the first electrically conductive trace and physically separated therefrom,
wherein the third electrically conductive trace comprises a substantially straight section that runs substantially parallel to the first electrically conductive trace and substantially parallel to a surface of the flex circuit, the substantially straight section operative to sample the first communication signals for processing by an interference compensation circuit that is operative to compensate for the received interference, and
wherein the substantially straight section of the third electrically conductive trace is isolated from the first electrically conductive trace in a first frequency range below a frequency and is coupled to the first electrically conductive trace in a second frequency range above the frequency.

16. The system of claim 15, wherein the interference compensation circuit is operative to transition to a standby mode in response to a receiver or a signal source of the system transitioning from a first predetermined state to a second predetermined state.

17. The system of claim 15, wherein the interference compensation circuit comprises a memory, and
wherein the interference compensation circuit is operative to:
in response to a receiver or a signal source of the system transitioning from a first predetermined state to a second predetermined state, store an operating parameter in the memory and transition from an active mode to a standby mode; and
in response to the receiver or signal source transitioning from the second predetermined state to the first predetermined state, retrieve the operating parameter from the memory and transition from the standby mode to the active mode.

* * * * *